(12) United States Patent
Forster-Knight et al.

(10) Patent No.: US 11,287,311 B2
(45) Date of Patent: Mar. 29, 2022

(54) WATER METER AND SYSTEMS

(71) Applicant: South East Water Corporation, Melbourne (AU)

(72) Inventors: Andrew Forster-Knight, Melbourne (AU); Juan Londono, Melbourne (AU); Eddy Mofardin, Melbourne (AU); Ninad Mohan Dharmadhikari, Melbourne (AU); Jonathan Philip Crook, Melbourne (AU); Matthew Swan, Melbourne (AU); Colin Neil Gehrig, Melbourne (AU); Thomas James Merry, Melbourne (AU); Owen David Neeson, Melbourne (AU); Joseph Ignatius Maria Van Der Plas, Melbourne (AU)

(73) Assignee: South East Water Corporation, Frankston (AU)

( * ) Notice: Subject to any disclaimer, the term of this patent is extended or adjusted under 35 U.S.C. 154(b) by 0 days.

(21) Appl. No.: 17/032,525

(22) Filed: Sep. 25, 2020

(65) Prior Publication Data
US 2021/0055153 A1 Feb. 25, 2021

Related U.S. Application Data

(63) Continuation of application No. 16/341,475, filed as application No. PCT/AU2017/051111 on Oct. 13, 2017, now Pat. No. 11,029,196.

(30) Foreign Application Priority Data

Oct. 13, 2016 (AU) ................................ 2016904153
May 26, 2017 (AU) ................................ 2017902012

(51) Int. Cl.
*G01H 11/08* (2006.01)
*G01M 3/28* (2006.01)
(Continued)

(52) U.S. Cl.
CPC .............. *G01H 11/08* (2013.01); *G01M 3/28* (2013.01); *E03B 7/072* (2013.01); *G01F 1/05* (2013.01); *G01F 1/58* (2013.01); *G01F 1/66* (2013.01)

(58) Field of Classification Search
CPC .... G01H 11/08; G01M 3/243; G01M 3/2807; G01M 3/28; G01M 3/2815; G01F 1/66; G01F 1/72
See application file for complete search history.

(56) References Cited

U.S. PATENT DOCUMENTS 3,078,099 A 2/1963 Hyman
3,120,622 A 2/1964 Dranetz
(Continued)

FOREIGN PATENT DOCUMENTS

EP 2314997 A1 4/2011
GB 2033584 A 5/1980

OTHER PUBLICATIONS

Dec. 22, 2017—ISR & WO for PCT/AU2017/051111.
(Continued)

*Primary Examiner* — Helen C Kwok
(74) *Attorney, Agent, or Firm* — Banner & Witcoff, Ltd.

(57) ABSTRACT

Some embodiments relate to a vibration sensor. The vibration sensor comprises: a sensor base to couple to a vibration source; a piezoelectric transducer coupled on a first side of the transducer to the sensor base; at least one conductor coupled to the piezoelectric transducer; and a seismic weight positioned on a second side of the piezoelectric transducer; wherein the sensor base, the piezoelectric transducer and the seismic weight are aligned along an axis and arranged so that relative movement between the sensor base and the seismic weight arising from the vibration source causes a current to be generated in the piezoelectric transducer and an output (Continued)

signal corresponding to the generated current is detectable on the at least one conductor.

19 Claims, 20 Drawing Sheets

(51) Int. Cl.
*E03B 7/07* (2006.01)
*G01F 1/05* (2006.01)
*G01F 1/58* (2006.01)
*G01F 1/66* (2006.01)

(56) References Cited

U.S. PATENT DOCUMENTS

| | | | |
|---|---|---|---|
| 4,225,802 A | 9/1980 | Suzuki et al. | |
| 4,359,658 A | 11/1982 | Cartier | |
| 4,373,378 A | 2/1983 | Fujishiro et al. | |
| 4,374,472 A | 2/1983 | Nishimura | |
| 4,447,755 A | 5/1984 | Ghiurea | |
| 4,982,599 A | 1/1991 | Komurasaki | |
| 5,052,226 A | 10/1991 | Schmid | |
| 5,063,782 A | 11/1991 | Kellett | |
| 5,272,646 A * | 12/1993 | Farmer | G01M 3/2815 340/605 |
| 5,361,636 A * | 11/1994 | Farstad | G01M 3/243 73/40.5 A |
| 5,408,878 A | 4/1995 | Lysen | |
| 5,661,361 A | 8/1997 | Lysen | |
| 5,974,862 A * | 11/1999 | Lander | G01M 3/243 702/51 |
| 6,212,940 B1 | 4/2001 | Castaing et al. | |
| 6,279,395 B1 | 8/2001 | Insalaco et al. | |
| 6,567,006 B1 * | 5/2003 | Lander | G01M 3/243 340/605 |
| 6,655,211 B1 | 12/2003 | Schmid et al. | |
| 6,739,182 B2 * | 5/2004 | Mueller | G01L 23/222 73/35.11 |
| 9,759,589 B2 * | 9/2017 | Albertao | F17D 5/02 |
| 9,841,316 B2 | 12/2017 | Zusman | |
| 11,105,705 B1 * | 8/2021 | Lowitz | G05D 7/0641 |
| 2002/0073768 A1 * | 6/2002 | Joynes | G01M 3/243 73/40.5 A |
| 2005/0279169 A1 * | 12/2005 | Lander | G01M 3/243 73/592 |
| 2013/0197833 A1 * | 8/2013 | Israeli | G01M 3/2815 702/51 |
| 2013/0307701 A1 * | 11/2013 | Forster-Knight | G01M 3/243 340/870.02 |
| 2014/0366612 A1 * | 12/2014 | Horne | G01M 3/2807 73/40.5 A |
| 2015/0247777 A1 | 9/2015 | Kondou | |
| 2016/0335875 A1 * | 11/2016 | Alcorn | G01F 1/68 |

OTHER PUBLICATIONS

Weber, M., "Piezoelectric Accelerometers, Theory and Application", Metra Mess- und Frequenztechnik in Radebeul e. K, 2012.

* cited by examiner

WATER METER AND SYSTEMS

CROSS-REFERENCE TO RELATED APPLICATIONS

This application is a continuation of U.S. application Ser. No. 16/341,475 filed on Apr. 12, 2019, which is a U.S. National Stage application under 35 U.S.C. § 371 of International Application PCT/AU2017/051111, filed Oct. 13, 2017, which claims the benefit of priority to Applications AU 2016904153, filed Oct. 13, 2016 and AU 2017902012, filed May 26, 2017. Benefit of the filing date of each of these prior applications is hereby claimed. Each of these prior applications is hereby incorporated by reference in its entirety.

TECHNICAL FIELD

Embodiments generally relate to vibration sensors. Particular embodiments relate to vibration sensors for fluid leak detection, optionally in combination with a water meter, and to systems and methods employing such vibration sensors.

BACKGROUND

Domestic and business premises commonly rely on a source of water for various purposes. For water usage tracking purposes, such premises commonly have a water meter positioned to meter the amount of water flowing in a supply line to the premises.

In nearby fluid conduits, leaks can occur. Some such leaks can be minor and have minimal consequences, while other leaks can be significant and/or have significant consequences if they are not identified early and repaired.

Some prior techniques of fluid leakage detection in fluid conduits, such as water mains, have needed maintenance personnel to periodically attend the site of suspected leaks around a water supply network and be present at the site for significant periods while using cumbersome and/or costly listening devices. Such techniques may sometimes take years to effectively monitor and determine leaks with in a water supply network. The engagement of such leak detection services can represent a significant cost to water utilities.

It is desired to address or ameliorate one or more shortcomings or disadvantages of prior vibration sensors, leak detection devices or leak detection techniques, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a vibration sensor, comprising:
 a sensor base to couple to a vibration source;
 a piezoelectric transducer coupled on a first side of the transducer to the sensor base;
 at least one conductor coupled to the piezoelectric transducer; and
 a seismic weight positioned on a second side of the piezoelectric transducer;
 wherein the sensor base, the piezoelectric transducer and the seismic weight are aligned along an axis and arranged so that relative movement between the sensor base and the seismic weight arising from the vibration source causes a current to be generated in the piezoelectric transducer and an output signal corresponding to the generated current is detectable on the at least one conductor.

The sensor may further comprise a compression component arranged to bias the seismic weight toward the sensor base. The compression component may comprise a spring. The spring may comprise a coil spring, wave spring or leaf spring. The one end of the spring may be coupled to the sensor base and an opposite end of the spring may be coupled to the seismic weight.

The spring may be disposed on a side of the seismic weight opposite to the sensor base and may be arranged to have a first end of the spring bear on a bearing surface of the sensor and to have a second end of the spring bear on the seismic weight.

A spring constant of the spring may be between about 1 N/mm and about 15 N/mm, optionally between about 2 N/mm and about 10 N/mm.

In a rest state of the sensor, the piezoelectric transducer may be compressed between the sensor base and the seismic weight.

The piezoelectric transducer may be formed as a column transducer.

The seismic weight may define a cavity and the piezoelectric transducer is disposed partly within the cavity.

The sensor may further comprise a housing to cover the seismic weight and the piezoelectric transducer. The housing and the sensor base may define a chamber within which the seismic weight has limited freedom to move.

The sensor may further comprise an electronic interface coupled to the at least one conductor and arranged to communicate with an external controller. The sensor may be reliant on supply of power from an external device for operation of the electronic interface.

The electronic interface may be configured to process input signals based on the output signal received via the at least one conductor to determine a fast Fourier transform (FFT) of the input signals. The electronic interface may be configured to amplify and filter the output-signal and perform an analogue-to-digital conversion of the amplified and filtered output signal in order to generate the input signals.

The electronic interface may be configured to perform a comparison of at least one frequency-specific threshold against at least one section of the frequency spectrum of the FFT and to set a detection flag when the comparison indicates that an amplitude of the frequency spectrum in the at least one section exceeds the respective at least one frequency-spectrum threshold. The detection flag may be communicated to the external controller to indicate detection of a predetermined condition.

The comparison may be performed multiple times for different frequency-specific thresholds and different sections of the frequency spectrum to set or not set multiple different detection flags based on the multiple comparisons.

The frequency spectrum of interest may be between 0 and 1000 Hz, for example.

The electronic interface may be configured to sample the output signal for a short time period in response to an operation signal received from the external controller. The short time period may be between 0.05 seconds and 1.0 second. The short time period may be between 0.05 seconds and 0.2 seconds.

The electronic interface comprises a microcontroller to process the input signals and determine the FFT. The microcontroller may be responsive to provision of power and on operation signal from the external controller to receive and process the input signals.

The at least one conductor may comprise a first conductor coupled to a first end of the piezoelectric transducer and a second conductor coupled to an opposite second end of the piezoelectric transducer, wherein the output signal is detectable on the first and second conductors.

The seismic weight may have a mass of between about 20 grams and about 250 grams. The seismic weight may be axi-symmetric about the axis.

DETAILED DESCRIPTION

Some embodiments generally relate to fluid meters, such as water meters, and to systems and methods employing such fluid meters. Some embodiments generally relate to vibration sensors. Particular embodiments relate to vibration sensors for fluid leak detection, optionally in combination with a water meter, and to systems and methods employing such vibration sensors.

Figure 1:
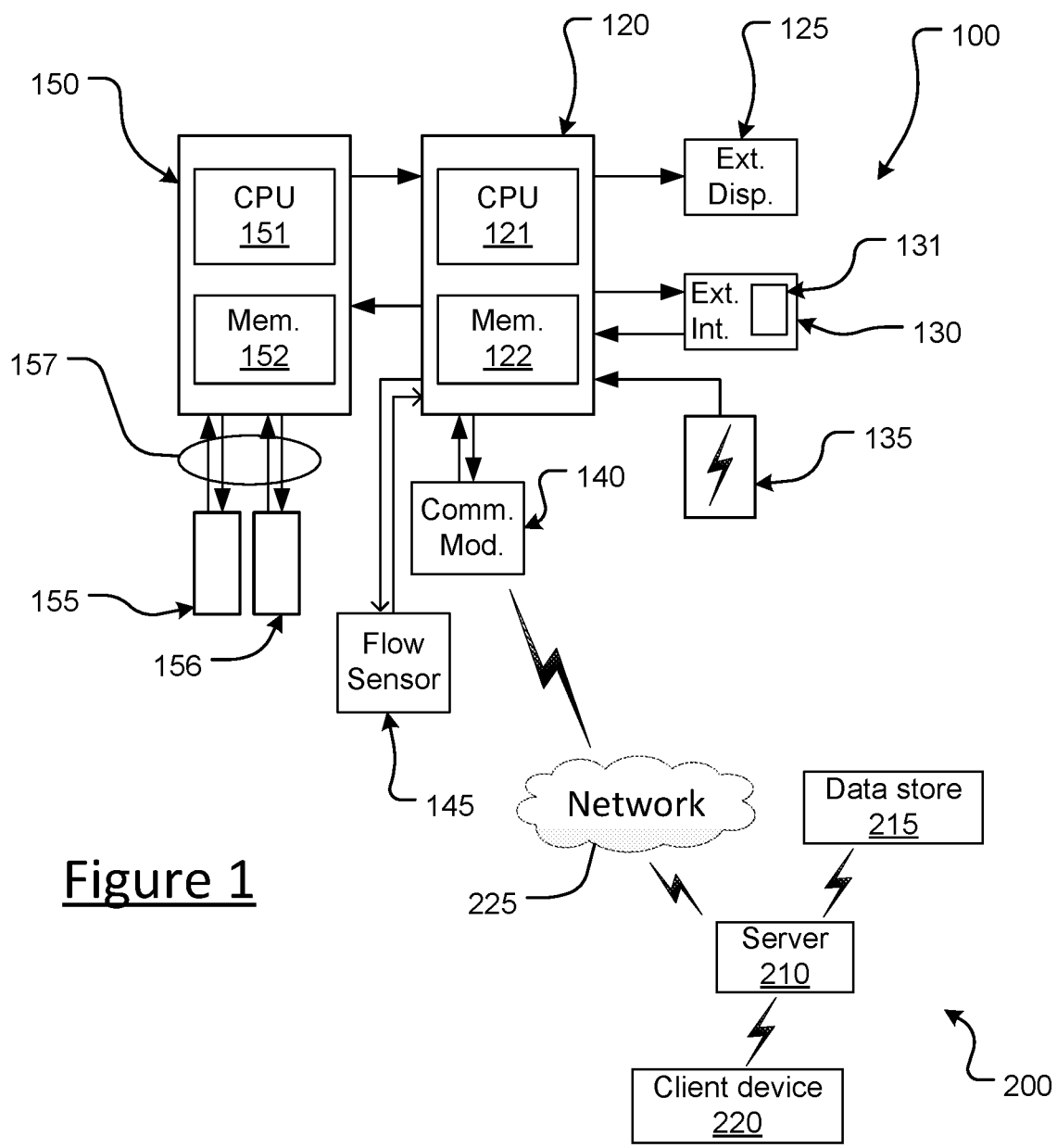
FIG. 1 is a block diagram of a fluid metering system according to some embodiments.
Figure 2:
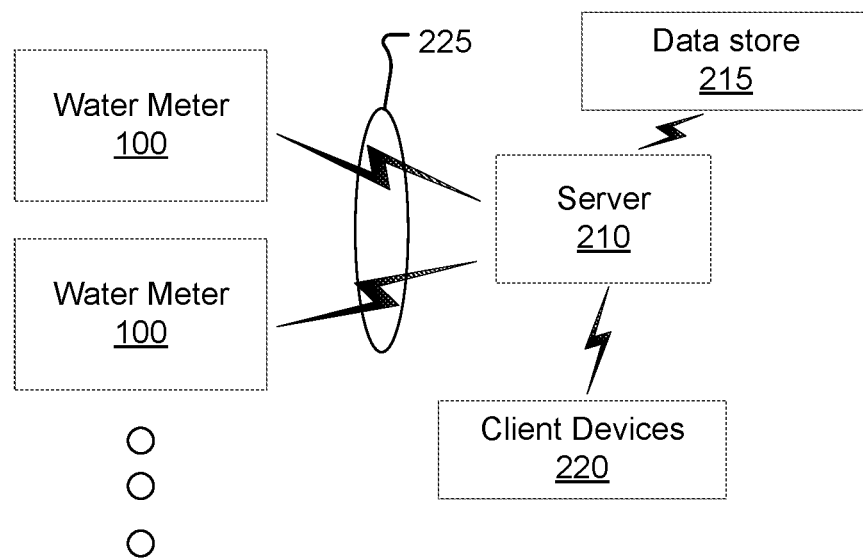
FIG. 2 is a further block diagram of the fluid metering system.
Figure 3:
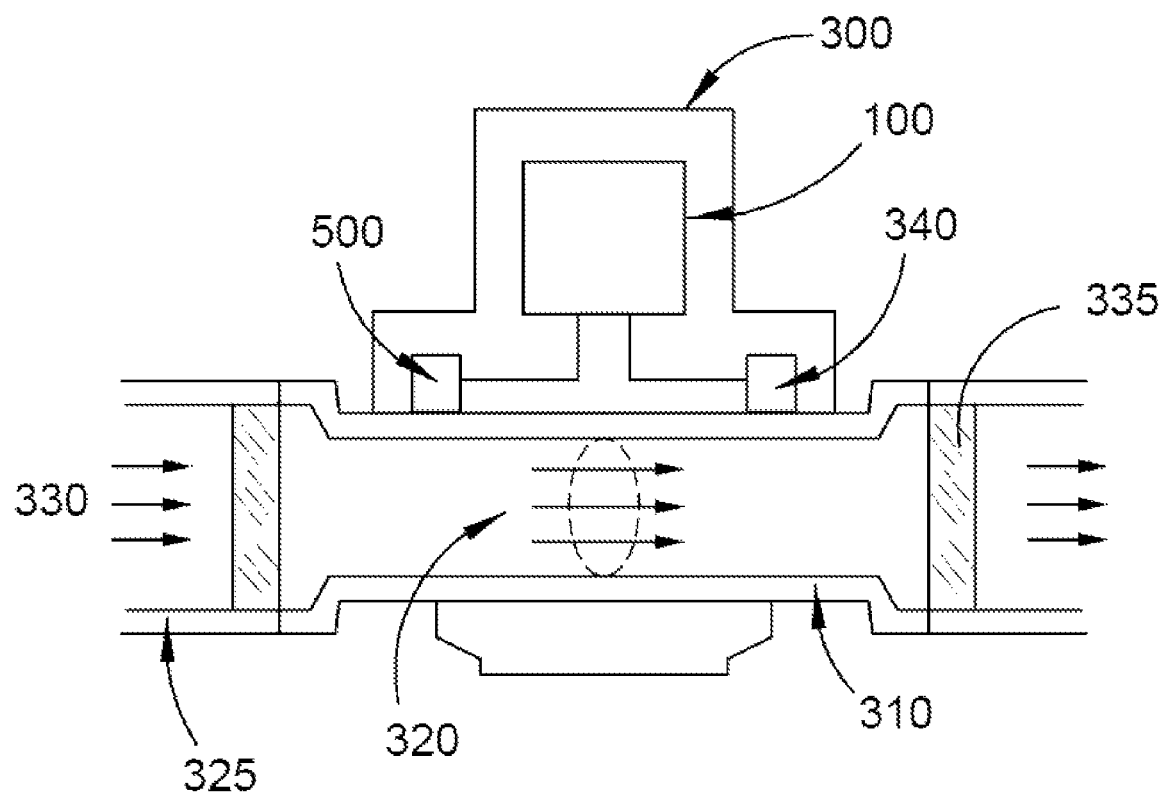
FIG. 3 is a schematic diagram in cross-section of a water meter according to some embodiments.

Referring in particular to FIGS. 1 to 3, a fluid metering system 200 is described in greater detail. The system 200 comprises at least one water meter 100 that is in communication with a server 210 via a network, such as a public or partly public network including wireless telecommunications infrastructure. The server 210 has access to a data store 215. In practice, many fluid meters 100 will form part of system 200, with each of those meters 100 being in communication with the server 210 via network 225.

A housing 300 (FIG. 3) houses a water meter 100 and a sensor installation 340 comprising a flow sensor 145 for sensing fluid flow 320 within the conduit, and one or more sensors 155, 156 for sensing at least one condition of the fluid or fluid conduit.

In some embodiments, the water meter 100 is a static flow meter such as an ultrasonic or magnetic flow meter. Other embodiments may comprise a mechanical flow meter. This meter will be configured to measure fluid flow characteristics such as maximum/minimum flow rate, reverse flow, and other characteristics within a fluid conduit, referred to for convenience as lumen 325. The meter may comprise a flow tube 310 having a hollow internal space to receive and conduct fluid flow 320 from fluid supply side 330 and suitable for sensing a fluid condition about a fluid flow 320, using flow sensor 145, and embedded flow sensors 155, 156.

The flow tube 310 may be made of a suitable material to allow for fluid sensing by the flow sensor 145. Some embodiments may comprise a brass flow tube.

Flow sensor 145 is communicatively and electrically coupled to first controller 120, having a processor 121 and memory 122. The first controller 120 receives power from power supply 135 and transmits power through to the other system components. First controller 120 is communicatively and electrically coupled to a second controller 150, which itself is electrically and communicatively coupled to one or more sensors 155, 156. In some embodiments of the invention, the functions of the first controller 120 and second controller 150 may be consolidated into a single controller or processor. In some embodiments, one or more functions of the first controller 120 and second controller 150 may be conducted by another number of controllers and/or processors. For example, embodiments may include additional processor circuitry, such as a digital signal processor (DSP), but such additional processor circuitry should be understood to be included as part of the controller or processor described herein unless context indicates otherwise.

The first controller 120 only turns on power to the second controller and the one or more sensors when it is desired to take a sensor reading in relation to fluid conditions in the conduit, and the first controller removes power from the one or more sensors at other times. The desired sensing interval may coincide with a daily data payload, and be conducted according to a configurable interval.

The one or more sensors 155, 156 are electrically and communicatively coupled to a second controller 150, having a processor 151 and memory 152, configured to control activation of the one or more sensors according to a configurable interval. The one or more sensors may include sensors to detect fluid pressure, vibrations within the lumen 325, temperature, and other fluid characteristics. Sensors to detect other conditions may also be provided, and more than one type of sensor may be used to measure one type of condition. Depending on what information is desired to be gathered, a sub-set of those sensors may be comprised in system 100. For example, it may be desired in some instances to measure fluid flow rate, fluid pressure, and conduit vibration for leak detection, and in other instances to measure fluid flow rate, conduit vibration for leak detection, and water quality.

Commercially available sensors may be used as sensors under the control of the second controller, modified as necessary to operate at low power, or modified to allow for small measurement thresholds. The separation of second controller 150 and sensors 155, 156 from the first controller 120 and flow sensor 145 may allow for adaptation of existing, commercially available flow meters to be used as water meter 100, with additional modification through inclusion of a second controller 150 within the housing 300.

In some embodiments, first controller 120 and second controller 150 may comprise a single main controller, having at least one processor and memory, and performing the same functions.

A power supply 135 provides power to the housed system, including the one or more sensors, through connection to the meter's first controller 120, which in turn supplies power to the second controller 150.

A communications module 140 is electrically and communicatively connected to the first controller 120, for the purpose of communicating with and receiving instructions from a client device 220 over a network 225, Referring particularly to FIG. 3, the housing 300 may be an IP68 (acc. EN60529) rated enclosure that is manufactured from plastic that is highly resistant to UV damage, temperature fluctuations, and other environmental factors. In some embodiments the meter system 100 within housing 300 may be sufficiently watertight to withstand full immersion in water for at least 48 hours without sustaining permanent damage. The threaded or flanged coupling portions 335 of the meter may be brass, and provide an upstream and/or downstream orientation with an upstream end coupled to the supply network and a downstream end coupled to the customer premises. In some embodiments, a suitable alternative metal or material may be substituted. Some embodiments comprise a completely metallic flow tube 310. The threaded coupling portions 335 may be joined by a conductive metal band. In embodiments comprising a plastic flow tube or other material, safety or bonding wires may be used in order to allow meters to be safely installed or maintained without risk of electrocution. The meter system 100 within housing 300 should meet minimum electro-magnetic immunity and electro-static discharge (ESD) standards such as IEC 61000-4.

The meter system 100 may have environmental limits of at least −10 to +55 degrees Celsius, and 5% to 95% humidity while operating or in storage. The meter system 100 may be capable of operating in direct sunlight at up to at least 45 degrees Celsius (in some embodiments up to 50 degrees Celsius) ambient air temperature.

The meter system 100 may provide suitable electrical conductivity across the housing and connectors to ensure continuity of earth for installations which rely on water pipes as a means of earthing the mains electricity supply.

In some embodiments, the meter system 100 construction materials will be chosen to minimise the recycling value of the meter, using a minimum of materials with high recycling value such as copper or brass to reduce risk of theft or vandalism of the meter system 100.

The housing 300 may also accommodate buttons, switches, lights, or manually actuated systems which would allow for an operator to ascertain an operational status of the meters, or manipulate certain functions of the meter, such as manual power operation, taking of readings, and forcing a data payload. These functions may be accommodated in external display 125 or external interface 130. For example, an activation mechanism that wakes the meter from its sleep/dead/low-power mode so that it turns on and connects to the network. An embodiment of this mechanism may be a push button, magnet, or an LED actuation featured on external interface 130.

The housing 300 may further allow for a local display 125 readable in direct sunlight from a suitable distance, nominally 100 cm. The local display 125 may be capable of displaying information about the meter or sensed conditions in the lumen 325, such as total water consumption in kL with a resolution of 0.1 L or better, the current time of day, the meter state or triggered alarms, instantaneous flow rate, communication status, the last readings for pressure, water temperature, or other information.

Housing 300 may provide for access to external display 125, showing local visible indications (for example using visible LEDs) of:

Power on/off—meter operating or not operating (hibernating)
Communications (unavailable/searching/connected)
Battery level (percentage or voltage)
Internal fault (such as memory corruption, software error, communications hardware failure)

In some embodiments, the installation 100 and housing 300 may be oriented horizontally or vertically, and may be installed directly in line with a lumen 325 or be installed in a bypass tube connected to a lumen 325. The installation may be installed with minimum upstream distance, on a lumen 325 connected to a fluid supply network 330. The meter system 100 may continue to meet all requirements in any installed orientation.

In some embodiments, a high-gain antenna may be installed in electrical and communicative connection with communications module 140, to improve signal strength in areas of low coverage. An embodiment may encompass a low profile fixture, situated on the lid of the meter or within the meter housing 300. Alternative embodiments may encompass at least one external antenna port suitable to receive a later installation of a high-gain antenna, the antenna port being in electrical and communicative connection with the communications module. In such embodiments the antenna and antenna port may comprise a suitable material, meeting an IP68 rating, and be resistant to UV damage, temperature fluctuations, and other environmental factors. In other embodiments any required communications antenna would be mounted internally.

The power supply 135 to the meter 100 supplies power to all components. The power supply 135 may be of a kind having a long life and low self-discharge, suitable to be installed for long periods (ideally 10, 15, or more years) without requiring a replacement. An embodiment of the power supply 135 may be in the form of a lithium battery, with capacity to 3.0V (@0.5a @1% duty cycle) of 19 Ah, nominal voltage of 3.6V, maximum 1 second pulse to 3.0V of 3 A, maximum pulse length @0.5 A to 2.8V of 1000 seconds, no delay time to 3.0V @0.5 A, a weight of approximately 140 g, a safe operating range of −40° C. to +85° C., and a 96% capacity retention after 10 years, for example. However, other suitable power supplies may be used with different operational and/or functional parameters to those listed immediately above. The housing 300 should allow access to the power supply 135 for maintenance or replacement.

Referring to FIG. 1, the system 100 features both a first 120 and second controller 150.

The first controller comprises a processor 121 and a memory 122. The memory 122 may comprise a combination of volatile and non-volatile computer readable storage and has sufficient capacity to store program code executable by processor 121 in order to perform appropriate processing functions as described herein. For example, processor 121 executes program code stored in memory 122 to activate the second controller 150 or flow sensor 145, which in turn take readings as required. Processor 121 may activate other system components within water meter 100, such as external display 125, external interface 130, and the communications module 140.

The first controller 120 also receives power through power supply 135, and provides the power from power supply 135 through wired connections to the second controller 120 and sensors 155, 156, as well as to the remainder of the system components.

The first controller 120 interfaces with communications module 140, and is capable of receiving instructions or firmware upgrades over a network 225, and sending stored data through network 225. This data may relate to meter status, or sensed conditions within the lumen 325.

The second controller 150 comprises a processor 151 and a memory 152. The memory 152 may comprise a combination of volatile and non-volatile computer readable storage and has sufficient capacity to store program code executable by processor 151 in order to perform appropriate processing functions as described herein. For example, processor 151 executes program code stored in memory 152 to provide power to sensors 155, 156 and to take and store data sensed from sensors 155, 156 about a fluid condition within a lumen 320 of a flow tube 310. The flow tube 310 may form part of a meter assembly comprising meter 100 and the metering functions of the meter 100 are carried out in relation to fluid flowing in the flow tube 310.

Memory 152 may store sensed fluid data in a data register, to be sent through communications network 225 upon request of a client device 220 connected to network 225, or as instructed by program code stored in memory 152, 122.

Processors 121, 151 are referred to in FIG. 1 as CPUs (central processing units). This term is used in a non-limiting capacity and any suitable processor or microprocessor may be used. In embodiments where the first controller 120 and second controller 150 comprise a single controller, the single controller may have at least one memory and at least one processor according to the above.

The first controller 120 or second controller 150 may be optionally configured to receive instructions and communicate directly with a client device 220, for example a handheld device or laptop computer, in order to locally configure or diagnose the meter through a local data interface 131. Embodiments of local interface 131 may be in the form of an optical, wired, or wireless communication system, suitable for connection to a laptop computer and/or handheld device. It is envisioned that this local data interface 131 may only be accessed in cases of meter fault or if other changes are required in the field, as configuration of the meter is otherwise possible over a network 225 through communications module 140.

Through this local data interface 131, all parameters such as alarms, transmission intervals, and other related fields are may be configurable or programmable. Diagnostic logs providing meter information may be extracted through this interface. It is desirable that connection to the local data interface 131 uses zero or minimal power from the power supply 135, instead being powered by the client device itself.

In some embodiments, first or second controller memory 122, 152 may store a predetermined data storage capacity for storage of a minimum amount of measurement data. For example, first or second controller memory 122, 152 may have sufficient storage capacity to store a minimum of 10, 20, 30 or 40 days of time-stamped fluid data, together with the corresponding interval data, meter firmware information, and other pertinent information.

Further requirements for the local data interface 131 of some embodiments include the local data interface 131 providing a capability to retrieve all stored billing data, events, and alarms. The local data interface 131 may also be required to provide a capability to update firmware and to read or update configuration.

Access to the local data interface 131 may be secured through a standards based mutual authentication scheme. Any keys or certificates used may be able to be revoked and/or replaced. In some embodiments, the local data interface supports role-based access control. At a minimum "read-only", "configure", and "full access" roles may be supported. All of the access to the local data interface may be logged for audit purposes. At a minimum the audit log may include date/time, actions, and identity of user.

The first controller 120 or second controller 150 may have an internal clock. Sensed fluid flow characteristics may be time-stamped where required by a time set on the internal clock.

Referring now to FIG. 2, the water metering system 100 further comprises one or more servers or server systems, referred to herein for convenience as server 210, in connection with at least one wired client device 220 and a data store 215. In some embodiments, client device 220 comprises a wired computing device, or portable computing device such as a laptop or smartphone. Server 210 may comprise, or be arranged as, a supervisory control and data acquisition (SCADA) server to receive data from water meters 100 at various different locations.

This data is received over a data network comprising suitable communications infrastructure that is at least partially wireless, such as a cellular network.

For example, the communications modules 140 of flow meter systems 100 may be configured to transmit data to server 210 using the GSM or GPRS/3G standards for mobile telephony or their technological successors.

Thus, communication module 140 in communication with server 210 by direct mobile data communication using available mobile telephony infrastructure, rather than using a series of hops and other infrastructure to transmit messages. Alternatively, lower power, shorter distance wireless communication techniques may be employed, for example where a local wireless data hub is in sufficient proximity to support wireless communication with the communications module 140 within a nearby water meter system 100. However more direct forms of communication from the communication module 140 to the server 210 are preferred for simplicity, speed, and reliability.

Server 210 processes the data received from the communications module 140, and stores it in data store 215 for subsequent retrieval as needed. Data store 215 may comprise any suitable data store, such as a local, external, distributed, or discrete database. If the data received at server 210 from meters 100 indicate an alarm condition in any one or more of the meters 100, server 210 accesses data store 215 to determine a pre-determined appropriate action to be taken in relation to the specific alarm condition and then takes the appropriate action. The action to be taken may vary, depending on the meter 100, for example where some meters 100 may be configured to sense different conditions over others. Such actions may include, for example, sending one or more notifications, for example in the form of text messages and/or emails, to one or more client devices 220.

Regardless of whether an alarm condition is indicated by the data received at server 210 from meters 100, the received data is processed and stored in data store 215 for later retrieval by a server process and/or at request from a client device 220. For example, server 210 may execute processes (based on program code stored in data store 215 for example), to perform trending and reporting functions to one or more client devices 220.

The communications module 140 may be enabled for bidirectional communication with server 210, so that firmware updates can be received and/or diagnostic testing can be performed remotely, and that client devices may remotely configure data payload intervals, and/or request current (or real-time) data from the meter.

Referring to FIG. 1, communications module 140 is described in further detail. The communications module may be electrically and communicatively connected to a first controller 120, receiving power from power supply 135 through this connection, or directly in some embodiments.

The configuration of communications module 140 may include an antenna, and subscriber identity module (SIM) card. The communications module 140 may comprise additional components and/or circuitry (not shown) as judged by a person of ordinary skill in the art to be necessary or desirable in order to carry out the functions as described herein.

Some embodiments of the meter 100 have communication requirements including the meter 100 being capable of measuring and reporting over a network 225 on request:
  Instantaneous water flow rate (in litres per minute);
  Current battery level (in volts and estimated percentage);
  Total meter activity time (time spent awake, transmitting, receiving) and communications packet counters; and
  Current internal temperature.

In some embodiments, the meter 100 requires being capable of supplying identification data to the communications network on request.

The meter 100 may require being capable of supplying all stored interval data, register snapshots, events, alarms and any other business data or status information to the communications network on request and/or as scheduled.

In some embodiments, the meter 100 requires being capable of accepting firmware upgrades over the communications network. All firmware components may be upgradeable. The firmware upgrade process may be tolerant of communications outages, power interruptions, head end system outages, and errors in transmission.

Meter systems 100 may require being capable of independently and automatically detecting failures, and recovering or rolling back to previous known good settings or parameters (images) when recovery is not possible. The meter 100 may be capable of accepting configuration changes and reporting current configuration over the communications network 225.

In some embodiments, the meter 100 requires being capable of having its time synchronised over the communications network 225.

The meter 100 is required to have a configurable communications retry and back-off sequence that allows for resending of data payloads that were unsuccessfully sent to server 210. For example, if the meter attempts to send its data payload and is unsuccessful, it may retry a configurable number of times, such as 3, 5, 10, or some other amount of times. After this, it may return to deep sleep/low-power mode and attempt communications a number of hours later.

In other embodiments, the meter may retry sending unsuccessful payloads, and then return to deep sleep/low-power mode until the next scheduled transit time (for example, the following day). In such an embodiment, the meter and communications module may require the ability to handle larger than normal data payloads. For example, if the meter has not been able to communicate for 10 days, this would result in a payload 10 times the size of a regular payload that would cause the communications module 140 to be activated for a prolonged period.

In some embodiments, sensors 155, 156 are physically and/or electrically connected to second controller 150 and sense fluid conditions within the lumen 320. In other embodiments, the sensors 155, 156 may be electrically and/or physically connected to the first controller 120 or, where the functions of the first and second controller are provided by one controller, the sensors 155, 156 may be so connected to that controller. These sensors 155, 156 may comprise more than two sensors or sensor functions, at least one sensor including a vibration sensor, a pressure sensor, and stray current sensor. Sensors 155, 156 may include other sensors or sensor functions to sense electrical conductivity, fluid temperature, pH level and free chlorine levels. In some embodiments, multiple fluid conditions may be sensed by individual sensors.

FIG. 3 shows an embodiment where the meter system 100 is installed in-line with a fluid supply conduit 325, to communicate fluid from the supply conduit 325 through a fluid flow tube 310 via which conditions of fluid flow in the lumen 320 are detected. In this embodiment, a vibration sensor 500, a sensor installation 340 and other sensors 155, 156 are positioned on/in or in relation to the flow tube 310.

Sensors 155, 156 may be installed separately, or as one unit, depending on the configuration of sensors used. Sensor 155, 156 sense at least one condition within the lumen 320. Described sensors may be ultra-low powered, with low start-up currents and small stabilization times in order to minimize power consumption.

In some embodiments, sensor 155 comprises a vibration sensor 500, interfaced with the lumen 320 in order to detect vibrations in the upstream fluid supply conduit system. In some embodiments, a part of the vibration sensor 500 is in direct contact, for example by abutment, with a portion of the meter flow conduit coupling 335, positioned on the (upstream) supply side 330. The sensor 500 can be physically interfaced with the conduit coupling 335 using a suitable fixture technique. For example, an adhesive fixture or mechanical method of fixture such as a gasket fixture or screws can be used, provided that the fixture would not otherwise provide mechanical action in the form of further vibration.

Figure 5:
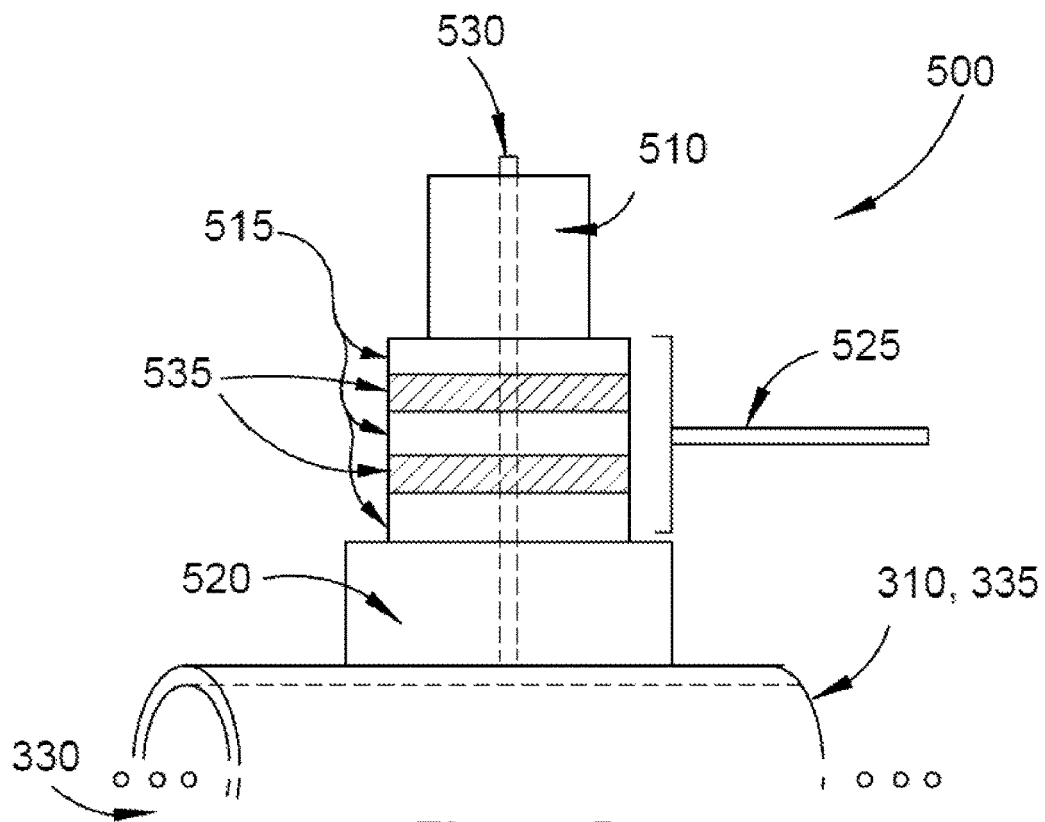
FIG. 5 is a schematic diagram of a vibration sensor according to some embodiments.

FIG. 5 depicts an embodiment of the vibration sensor 500, comprising a piezoelectric sensor system. The sensor 500 comprises at least one thin stacked electrically conductive plate 515 (made from a suitable material such as copper) and two or more piezoelectric elements or plates 535. The stack of piezoelectric plates 535 and conductive plates 515 are disposed between a seismic mass 510 and a base unit 520, which are connected to each other. Affixing shaft 530 clamps or connects the seismic mass 510 to or onto base unit 520, which may exert a compression force in rest state, but still allowing for small movement and compression of piezoelectric sensor plates 535 between copper plates 515. The base unit 520 comprises one or more masses configured to convey vibrational movement from the material of the flow conduit to the piezoelectric plates 535. The base unit 520 can also be an integral part of the meter flow conduit coupling 335 or flow tube 310 in the form of a cast mounting plate with provisions for fastening. The number of copper plate and piezoelectric layers may vary between embodiments. The example shown in FIG. 5 shows two copper plates 515 and three piezoelectric elements 535. Conductive plates 515 may be substantially thinner than piezoelectric plates 535, for example by a factor of around 5 to 20. In some embodiments, the copper plate may be between 0.1-0.2 mm in thickness, whereas the piezoelectric plates may be 1-2 mm in thickness, for example. It should be understood that FIG. 5 does not portray a scale embodiment of vibration sensor 500.

Vibrations transmitted along fluid conduits of an upstream fluid supply network may couple into the material of the flow tube of the meter 100 and thereby be transmitted to the base unit 520 that is connected to flow tube 310, or in some embodiments the meter coupling portions 335. When vibrations travel through base unit 520, piezoelectric plates 535 are compressed between against seismic mass 510 and base unit 520. One or more electrical conductors 525 may be connected to the copper plates 515 to carry current (or convey voltage differences) generated by the piezoelectric plates 535 to processing circuitry in the meter 100. In some embodiments a plurality of piezoelectric plates 535 are used to provide an amplifying effect on the vibration signal.

Sensor 500 may be configured to provide sensed fluid condition data along conductors 525 to a second processor 152, through process 400 or 600.

The material of the flow tube 310 that the sensor 500 is affixed to should be constructed from a material suitable to conduct detectable vibrations along its surface. It is envisioned that upstream supply conduits and/or the flow tube 310 may be formed of or comprise vibration-conducting metals, such as brass, or copper, however in some embodiments may comprise suitable alternative vibration-conducting materials.

Figure 6:
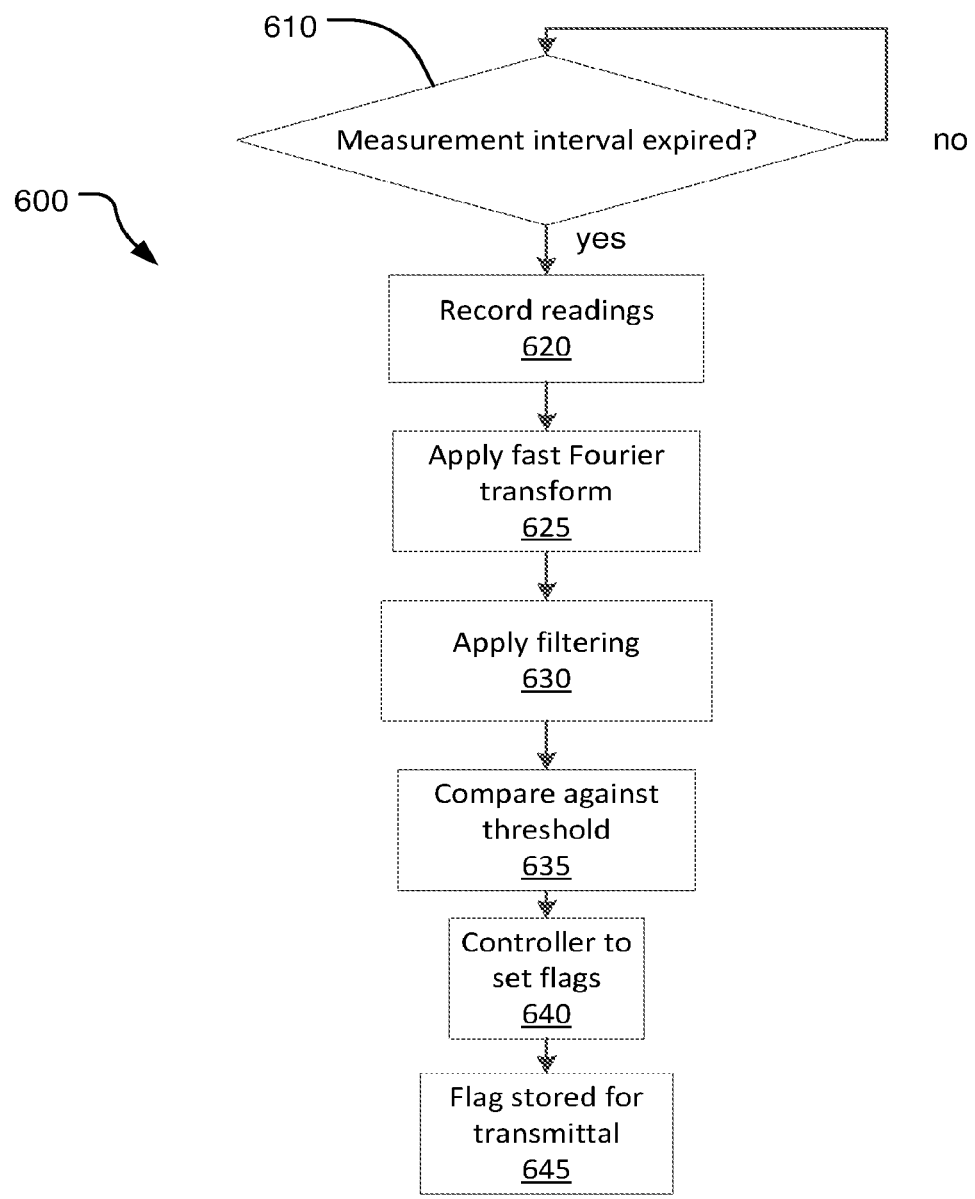
FIG. 6 is a flowchart of a method of leakage determination according to some embodiments.

An embodiment of a leak detection method 600 using vibration sensor 500 is described in FIG. 6. At 610 the vibration sensor 500 awaits activation from a second controller. Once a predetermined measurement interval (stored in memory 122) has expired, the first controller 120 causes power supply 135 to provide power to the second controller 150 to listen to output signals from vibration sensor 500. At stage 620, the controller may await diagnostic information from vibration sensor 500, and may await confirmation that sensor 500 is operational.

At 620, vibration sensor 500 captures vibration data in the form of an analogue signal. A number of readings may be taken in order at stage 620. The sensed data will be transmitted to the second controller 150 along conductors 525 and in some embodiments, stored in memory 152.

At 625 a first or second controller 120, 150 performs a Fast Fourier Transform (FFT) to the analogue time domain data. At 630 the FFT data may be subject to filtering, such as band pass filtering, to identify frequency ranges consistent with one or more predetermined leak conditions. An example of such an embodiment is rendered in FIG. 7 as a putative plot of the FFT output, with amplitude on the Y-axis and frequency on the x-axis.

Figure 7:
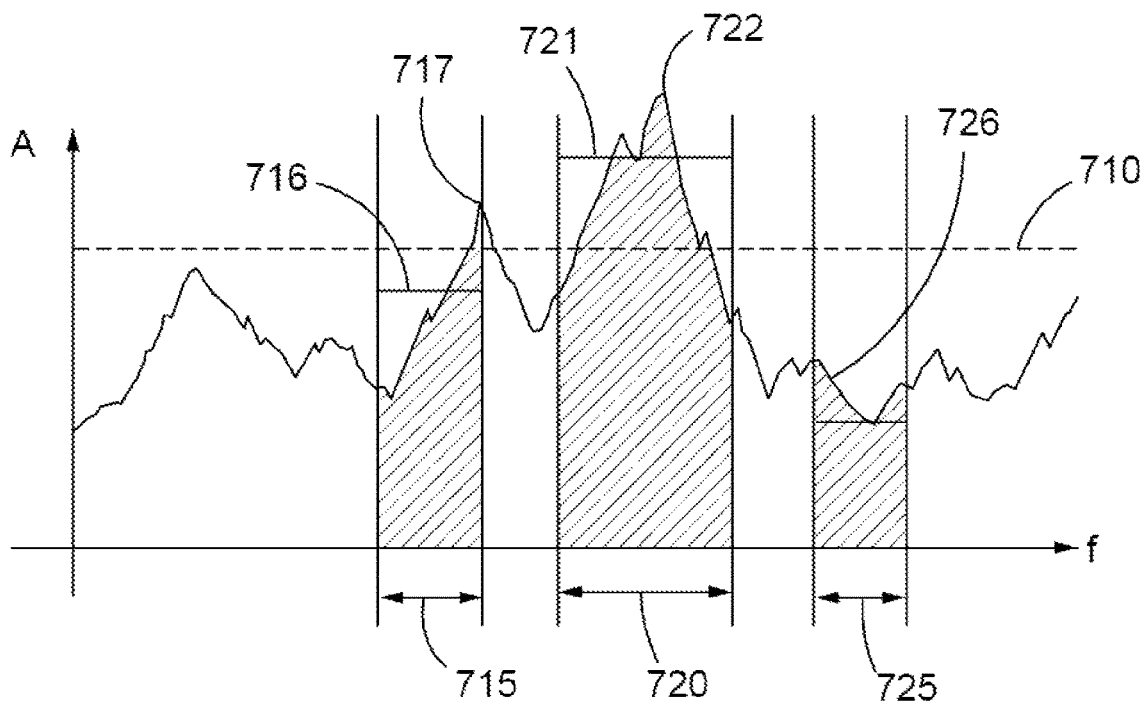
FIG. 7 is an example frequency spectrum of a signal output of a vibration sensor according to some embodiments.

At 635, after any filtering is applied to the FFT data, the data may be subject to a comparison against predetermined thresholds, further indicating leak conditions. In some embodiments, the threshold 710 may comprise an integral threshold, where leak conditions may be assessed based on the integral of the range of frequencies within a band pass filtered range. In such embodiments, the total area in a frequency range may be the condition assessed by threshold 710. FIG. 7 indicates one such example where the integral of a filtered frequency range 716 does not meet threshold 710, despite the presence of frequencies in a predetermined range 715. In such an embodiment, the integral 721 of frequency range 720 does surpass threshold 710 and as such, would be detected as a type of leak or leaks.

In some embodiments, threshold 710 may be an amplitude threshold, where both 715 and 720 contain frequencies 717, 722 within the filtered range that exceed the amplitude threshold 710. In such an embodiment, frequency range 725 would not surpass threshold 710 as although frequencies 726 within the filtered range are detected, their amplitude does not exceed the threshold.

In some embodiments, threshold 710 may be configured with a suitably low value, such that presence of a frequency with an amplitude greater than zero in a filtered range may indicate a type of leak or leaks. In such embodiments, frequency ranges 715, 720, 725 may all indicate the presence of a type of leak or leaks.

Various vibration frequency characteristics may be used to determine and differentiate different types or combinations of leaks. In some embodiments, at least one additional sensed characteristic of the fluid flow 320 may be used to identify at least one leak condition in conjunction with vibration data. For example, detection of a frequency in ranges 715, 720, 725 may not trigger an alarm condition unless it is detected in conjunction with a predetermined condition sensed by sensors 155, 156 or by flow sensor 145, for example, a detection of low flow rate, and/or detection of a low pressure. Where this additional condition is met, a frequency in the range of any of ranges 715, 720, 725 may indicate presence of a leak. Threshold 710 may be configured as per any of the above described embodiments, but also conditional upon the detection of at least one sensed fluid condition. In such embodiments, at least one sensed condition may be used in conjunction with the vibration such as temperature, pressure, flow rate, electrical conductivity, pH level, free chlorine levels, or other conditions sensed by sensors 155,156 or flow sensor 145.

After this stage is completed in 635, the first or second controller 120, 150 updates an alarm condition in 640 indicating the presence of a leak or leaks, or indicating that no leak or leaks are detected. This alarm may be a binary flag, comprising at least one bit. In such embodiments, a flagged bit may indicate presence of any leak.

In some embodiments, at least one bit may be used to flag the presence of a particular type of leak, for example a connection leak, or the presence of multiple leak conditions.

At stage 645, the alarm condition is stored within a first or second controller memory 152, 122 to be sent with normal data payloads.

In some embodiments, sensor 155 or 156 comprises a gauge pressure sensor that may operate in the 0-15 bar (0-150 mH$_2$O, i.e. in 'meters head of water') range. The data from the pressure sensor may be adjusted to accommodate the elevation of the meter and configuration of the meter 100 installation.

Some embodiments may comprise a commercially available pressure sensor having on-board analogue to digital conversion and incorporated temperature sensing capabilities. Such sensors should be reliable within the specified pressure range, and be ultra-low powered.

In some embodiments, the pressure sensor or other sensors 155, 156 may be installed within the internal cavity (lumen 320) of the flow tube 310, in a sensor installation 340 having a housing that may be in direct contact with fluid flow 330. In such an embodiment, the pressure sensor, sensor installation 340 and connections may be suitably waterproofed and resistant to wear from conditions of fluid flow 330. In other embodiments, sensor installation 340 comprises sensors 155, 156 in direct contact with fluid flow 330. In other embodiments, sensor installation 340 may be installed on the external body of flow tube 310. In such embodiments, sensors 155, 156 may not require direct contact with fluid flow 320 in order to take readings.

In some embodiments, sensor 155, 156 comprises a stray current detection sensor, optionally a magnetometer. The magnetometer may be located proximally close to the lumen 320 and configured to detect a magnetic field due to an electric leakage current present in or near the lumen 320.

Embodiments allow for detection of a magnetic field due to a leakage current above a certain Ampere level that can be harmful to humans or other animals, for example such as a current of 1 A. Alternative embodiments may allow for lower, or different current detection thresholds.

The stray current detection sensor may be configured to receive instructions from the at least one controller 120, 150. In some embodiments a second controller 120 may periodically poll the sensor to retrieve readings to be included in daily data payloads. Optionally to be polled at different times to the vibration sensor.

Detection of a stray current during a polling period may trigger an alarm condition, to be stored in a memory 152, 122 and sent in a regular (e.g. daily) data payload to external server 210 in accordance with process 400.

In some embodiments, the flow sensor/water meter system 100, herein referred to as water meter 100 for convenience comprises a magnetic flow meter or an ultrasonic flow sensor 145 in electrical and communicative connection with a second controller 120.

The flow meter controller 120 may be suitable for retaining measured flow data in memory 122 to be transferred with daily payload data over a network 225. Commercially available flow meter systems may be used, modified in some embodiments to suitably interface with a second controller 150 and sensors 155, 156.

The water meter 100 may comprise at least a means for detecting and/or measuring fluid flow 320 within a lumen 325, a means for detecting and/or measuring a minimum or maximum flow rate in a time period, means for detecting and/or measuring reverse fluid flow (that is, flow towards the fluid supply network 330). Temperature, electrical conductivity, free chlorine levels, or other fluid flow characteristics may be sensed, measured, and stored by a first controller 120 or second controller 150 depending on the flow meter capabilities.

Some embodiments of the water meter 100 have further requirements, such as having a minimum flow rate, being in the range of 10, 20, 40 litres per hour or higher as necessitated by the meter size. The meter sizes may vary, and may be in the range of 29, 25, 32, or 40 mm. Embodiments may comprise higher or lower sizes.

The meter 100 may require being configured with a maximum or minimum permissible error of measurement (MPE). In some embodiments this may comprise a range of 2-5%. The configuration of the MPE may be consistent with NMI R49 and class II meters.

The meter 100 may require being capable of detecting and measuring reverse flow.

In some embodiments, the meter 100 requires being fitted with either a single check valve, or a dual check valve.

The meter 100 may require being capable of recording (with timestamp) peak daily instantaneous flow in litres per second with a resolution of about 0.01 litres. The meter 100 may require being capable of measuring and recording water pressure in m.H$_2$O (i.e. "Meters head of water"). This pressure value may be gauge pressure.

In some embodiments, the meter 100 requires being able to measure and store water consumption interval reads (the interval data), total water consumption accumulation (the accumulation register), and time aligned snapshots of the accumulation register (the register snapshots) (collectively known as billing data). The interval length for interval data may be configurable supporting at minimum the following values: 1 minute, 5 minutes, 15 minutes, 30 minutes, and 60 minutes. In some embodiments, other values may be used. An accumulation register may be measured and stored in kilolitres with resolution and significant digits based on meter size, with resolutions potentially in the range of about 100,000 to about 1,000,000 kL.

The interval data may be measured and stored in litres with resolution and significant digits based on meter size, with resolutions potentially ranging between 100 to 10,000 L.

It is envisioned that data payloads may be transmitted from a first controller 120 across a network 225 once per predetermined time period (i.e. a day). This transmission frequency may be a configurable parameter, allowing for more or less frequent payload transmission. Data collection intervals for all sensed data may be configurable.

An embodiment of the data payload content is described below. The contents of the data payload may vary depending on the capabilities of the sensors used.

Volumetric fluid flow within the lumen 325 may be recorded and time-stamped every 30 minutes. In some embodiments, a shorter interval (such as 10 seconds) may be recorded and time-stamped for a first or second controller 120, 150 to summarize through algorithms, and to be transmitted with a daily payload.

As some embodiments of the flow meter may record data every few seconds, only the value and timestamp of the maximum flow rate each day may be transmitted. This data is valuable to determine instantaneous flow spikes at each meter 100.

In some embodiments of the meter 100, temperature and/or electrical conductivity may be sensed. These may be sensed either with embodiments of sensors 155, 156 or the flow sensor 145. In embodiments where these conditions are sensed, time stamped values of the sensed fluid data may be recorded at configurable intervals, for example, every 4 hours. This dataset is to be transmitted daily along with the main flow data payload.

In monitoring power consumption, voltage level of the power supply 135 may be transmitted along with daily payloads to monitor life. Additionally, daily meter communication activity time may be recorded and transmitted with the daily payload as an indicator of meter power consumption based on its attempts (successful or unsuccessful) to connect to the network 225. Daily activity time may indicate the time in seconds that the meter was activating the communications module 140.

In some embodiments, alarms to come with a daily payload may be customer leakage alarms, potentially a binary flag indicating continual usage (for example, a recorded flow rate of greater than 5 L/h for 24 hours. This value may be configurable, and have a default value prescribed.

A reverse flow alarm may be recorded in a binary flag. Reverse flow volume may be recorded in litres of fluid flowing in the reverse direction, for example, toward the water supply network.

An empty pipe alarm may be indicated through a binary flag, and detectable through operation of the flow sensor 145.

A Tamper alarm will indicate presence of strong magnetic fields or other electrical sources that effect a magnetic flow meter embodiment. This may optionally indicate tampering through vandalism or opening the water meter housing 300.

Some embodiments of the flow sensor 145 configuration would allow for a high/low pressure alarm. The threshold for this alarm may be configurable per meter, having an initial default value. This alarm may be able to be enabled or disabled by user choice.

High/low temperature alarms may be user configurable, having default high and low temperature threshold values stored in the first or second controller memory.

A high flow alarm may indicate whether fluid flow 320 within the lumen 325 is abnormally high for a defined period of time. This alarm may be triggered based on a default alarm threshold triggering value and may be configurable. Triggering of this alarm may indicate the presence of a broken pipe, for example.

A network leak alarm may be a binary flag and may be based on frequency output of the vibration sensor. When an identified frequency is detected that has amplitude over a defined threshold, and that is characteristic of a fluid supply network leak, this alarm will be triggered.

These alarms may require acknowledgement from server 210, and may transmit again upon change of state. If not acknowledged by server 210, after a suitable interval, the meter 100 may continue to report the alarm binary value in the data payload until acknowledgement from the server 210 is received.

Through the server 210, multicast end-point firmware in the form of binary files, and configuration data may be able to be sent to some or all of the end-points meters 100. The mechanism for this may be efficient such that it has minimum impact on battery life. The at least one controller 120, 150 may store sent firmware/configuration binary files, and only apply them once fully downloaded and certified. If the data received by the meter 100 is incomplete or corrupted, some embodiments of the at least one controller 120, 150 may instead rely on existing configurations until such time as the new configuration data is acquired, rather than overwriting existing files.

A typical daily data payload is estimated to be approximately 100 bytes, including all mandatory and optional parameter data sets listed in the below table. In some embodiments, the payload will use the constrained application protocol (CoAP) and JavaScript Object Notation (JSON) or binary messages. An embodiment of a data payload, provided by way of example only, may comprise the following fields and data size distribution:

Date and timestamp data, 7 bytes
Flow data (48 readings of 0-999.9 litres each, with number of records in the dataset) ~62 bytes
Billing register, ~8 bytes
Meter identification data, ~8 bytes
Meter firmware version ~0.5 bytes
Battery voltage, ~9 bits
Meter daily activity time, ~17 bits
Pressure, 6 readings per day+read interval, ~7 bytes
Vibration, 3 readings per day+read interval, ~7 bytes
Daily maximum flow+timestamp offset, ~4 bytes
Other data may be transmitted with daily payloads depending on meter and sensor configuration.

Through access to the local data interface 131, a user may directly access or trigger the sending of payload data, or locally request measurements from the meter 100.

Payload data requirements according to some embodiments include the meter 100 being capable of locally storing (including in the absence of functioning communications) at least:

100 days of interval data (with 30 minute interval configuration) and register snapshots (with daily register snapshots);
The last 50 events. Where in some embodiments an event may be an alarm condition being triggered. In other embodiments an event may be a time-stamped instance of payload data transmittal; and
Alarm state (asserted/not asserted) for each alarm.

In some embodiments, the meter 100 also requires being capable of locally storing information recorded as an event which may be user configurable. The meter 100 may require being capable of recording as an event or alarm on a configurable basis:

Continuous low flow (leak detection) (not dropping below a provided value of litres per minute for a period of time);

Continuous high flow (burst detect) (more than a provided value of litres per minute for a period of time);

Detection of tampering;

Low battery (in some embodiments this may be in days remaining or in a percentage of capacity);

High internal temperature (greater than a value of degrees Celsius).

In some embodiments, the meter 100 may require being capable of recording as an event or alarm on a configurable basis the following features (where a suitable sensor is fitted):

Reverse flow (more than a provided value of litres per minute for a period of time).

High and low pressure (more or less than a provided value in meters.H2O).

High and low temperature (more or less than a provided value degrees).

It should be understood that provided values may optionally be configurable values in some embodiments.

In some embodiments, users may define alternative events or conditions as an alarm. Alarms may be able to be configured as be self-clearing (the alarm is cleared automatically when the alarm condition ends) or operator cleared (the alarm remains triggered until an operator clears it). A triggered alarm may generate one message when set and another when cleared (it does not continue to generate messages for the entire time the alarm condition is present). The current state of an alarm should be able to be read.

In some embodiments, the meter 100 may require suitable hysteresis to be implemented on alarm thresholds to prevent repeated triggering and clearing of alarms or repeated logging of events.

In some embodiments, the meter 100 may require being capable of maintaining an alarm state (triggered or not triggered) for each alarm and may provide a mechanism to clear the state.

Figure 4:
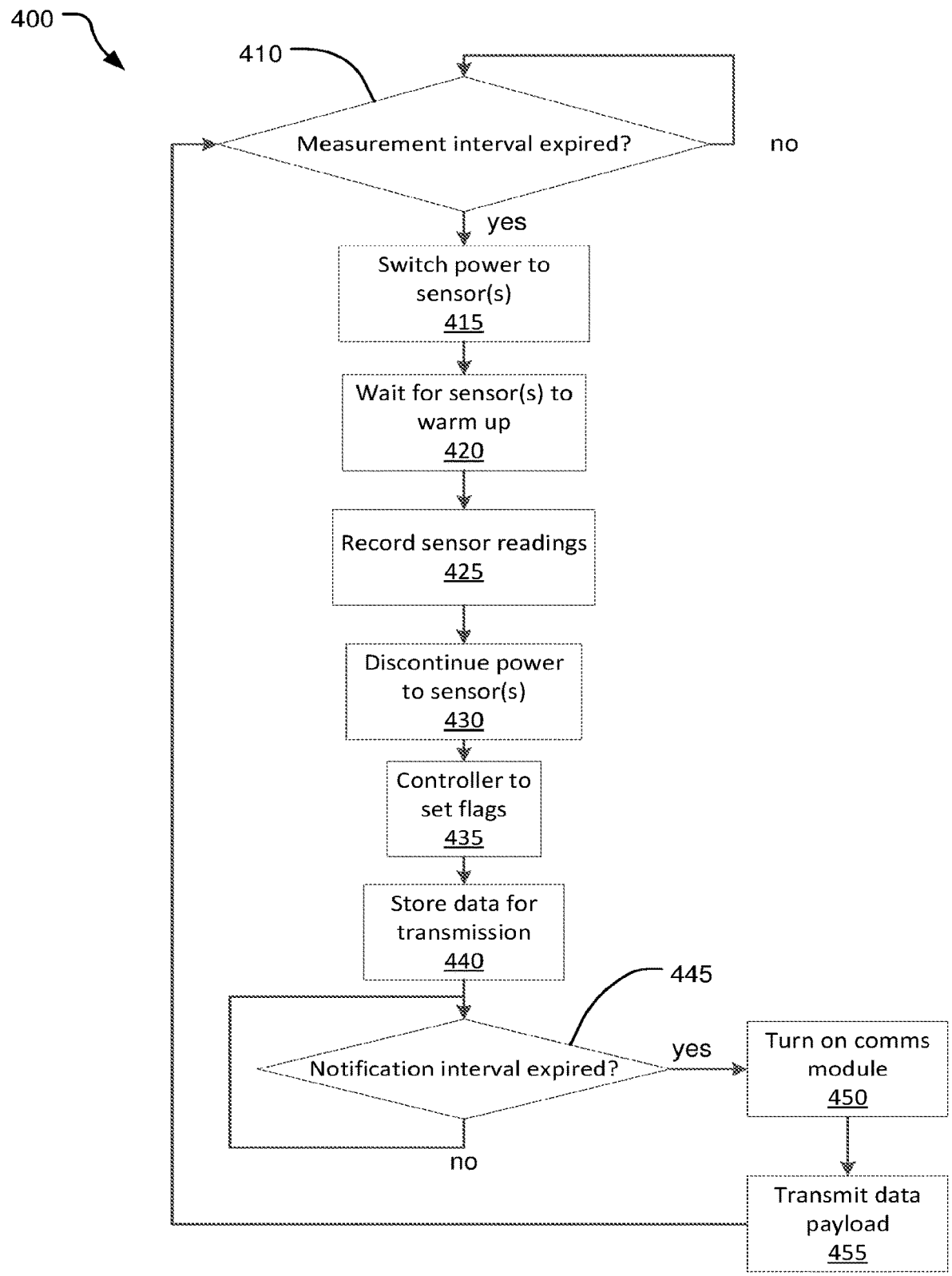
FIG. 4 is a flowchart of a method of operating a fluid meter according to some embodiments.

Referring now to FIG. 4, a method 400 of fluid monitoring is shown and described in further detail. Method 400 is executed by the at least one controller 120, 150 to control operation of the one or more sensors 155, 156, or flow sensor 145 to sense a condition of a fluid in a lumen 320.

In some embodiments of method 400, at 410 the first controller 120 waits for a preconfigured time interval to expire before switching power to the at least one sensor 155, 156, 145. The time interval of 410 may be user configured or a default value. After a time interval has expired in 410, the first controller 120 switches power to the sensors 415 and waits for a "warm up" period for the at least one sensor 155, 156, 145. This may comprise the at least one sensor powering up their own internal electronics, running their own operational diagnostics (if appropriate), and possibly indicating their operational state (e.g. properly operational or partially or fully non-operational). The interval timing may be aligned to hourly times based on the meter internal clock, or a timing defined from server 200. Other time alignments may be used as required.

Once the one or more sensors 155, 156, 145 have warmed up, and assuming they are operational, the sensors 155, 156, 145 measure the relevant conditions and indicate at 425 a value of the condition they are configured to sense by providing a digital or analogue output signal to their configured controller 120, 150 via cable 157. The output signals from sensors 155, 156, 145 are converted from analogue to digital signals, if appropriate, and then interpreted and stored in a memory 122, 152 for subsequent transmission to the server. During this time at 425, any additional computation of the sensed data using algorithms may be applied, if appropriate.

At 430, once the sensor measurements (i.e. output signals) have been received from sensors 155, 156, 145, the first controller 120 discontinues supply of power from power supply 135 to sensors 155, 156, 145. The first controller 120 processes the data derived from the output signals to compare measured values to preconfigured alarm condition levels. In some embodiments this process may be completed by the second controller 150. At 435 the at least one controller 120, 150 may set a binary flag indicating an alarm condition, for example.

If an alarm condition is detected, for example, because the sensed measurement exceeds or is equal to the alarm threshold for a particular sensor type, then the second controller 120 raises flag bits within the binary flag to indicate which alarm/s have been triggered. At 440, data is stored in the at least one controller memory 122, 152 to be stored upon expiration of the notification interval. This data may include typical payload data and/or alarm conditions.

At 445, if the notification interval has expired, the first controller 120 causes the communications module 140 to be turned on (for example, by causing power supply 135 to supply power to communications module 140) and an appropriate message to be transmitted to server 210 at 455. If the notification interval has not expired, the first controller may wait until the notification has expired before proceeding to 450. In some embodiments, the measurement interval in 410 may expire again before the notification interval in 445 expires. In such embodiments, data may be continually stored in 440 as discrete time-stamped entries without being overwritten.

Steps 440 and 445 may also be performed to send a notification message where lid sensor (not shown) on the water meter 100 detects the lid being opened or where some kind of fault in a sensor or telemetry unit 120 is detected.

The message sent to server 210 may include an identifier of the telemetry unit, a time stamp, an indication of one or more sensed values (if appropriate) and an alarm or notification type, for example. Meanwhile, until the notification interval expires at 445, steps 410 to 440 may again be executed a number of times.

The notification interval may be a period of hours, for example such as four, six, twelve, twenty four, or another number of hours, while the measurement interval may be in the order of a few minutes, for example such as one, two, three, four, five, ten, twenty, thirty, forty, fifty, sixty or more minutes.

In some embodiments, the notification interval may be configured to expire on the detection of an alarm in 435. In such embodiments, the detection of an alarm condition may trigger the transmittal of the alarm and/or the data payload. In one embodiment, users may configure the notification internal to expire, and for an alarm or data payload to be sent, upon detection of at least one alarm event. Such events may be the detection of one alarm condition, or a combination of alarm conditions.

Some embodiments of meter configurations, including suggested default sample intervals are detailed in the below table.

| Parameter | Model 1 | Model 2 | Alarm/ Event? | User configurable | Default sample interval | Default send interval | Value range | Units |
|---|---|---|---|---|---|---|---|---|
| Meter Identification | ✓ | ✓ | NO | No | N/A | Daily (with scheduled payload) | | N/A |
| Meter Firmware version | ✓ | ✓ | NO | No, | N/A | Daily (with scheduled payload) | | N/A |
| Flow register/accumulator | ✓ | ✓ | NO | No. | daily | daily | | kL |
| Flow interval data | ✓ | ✓ | NO | Yes. | 30 min | daily | 0-999.9 | L |
| Customer leakage alarm | ✓ | ✓ | YES | Yes | 24 hrs | daily | 0-99999 | L |
| Reverse flow alarm | ✓ | ✓ | YES | Yes, only to turn on or off | 6 hrs | daily | | |
| Reverse flow value | ✓ | ✓ | NO | Yes, only to turn on or off | 6 hrs | daily | 0-99999 | L |
| Empty pipe alarm | ✓ | ✓ | YES | On/off | 1 minute | Immediate ('real-time') | | |
| Tamper Alarm | ✓ | ✓ | YES | On/off | immediate | immediate | | |
| High/Low Pressure alarm | X | ✓ | YES | Yes | 4 hrs | daily | 0-150 | mH$_2$O |
| High/Low Temperature alarm | ✓ | ✓ | YES | Yes | 4 hrs | daily | −20-60 | Deg C. |
| High Flow Alarm (broken pipe) | ✓ | ✓ | YES | Yes | 1 hr | Real-time | 0-99999 | L |
| Network Leak Alarm | ✓ | ✓ | YES | Yes | 1 hr | daily | | |
| Daily max flow | ✓ | ✓ | NO | No | 10 sec | daily | 0-999 | L |
| Temperature interval data | ✓ | ✓ | NO | Yes | 4 hrs | daily | −20-60 | Deg C. |
| Pressure interval data | X | ✓ | NO | Yes | 4 hrs | daily | 0-150 | mH$_2$O |
| Vibration interval data | ✓ | ✓ | NO | Yes | 1 hr | daily | | |
| Battery Voltage | ✓ | ✓ | NO | No | Daily | daily | 0-3.3 | Volts |
| Low Battery Alarm | ✓ | ✓ | YES | No | — | daily | 0-3.3 | Volts |
| Meter activity time | ✓ | ✓ | NO | No | Daily | daily | 0-86400 | seconds |

Figure 8:
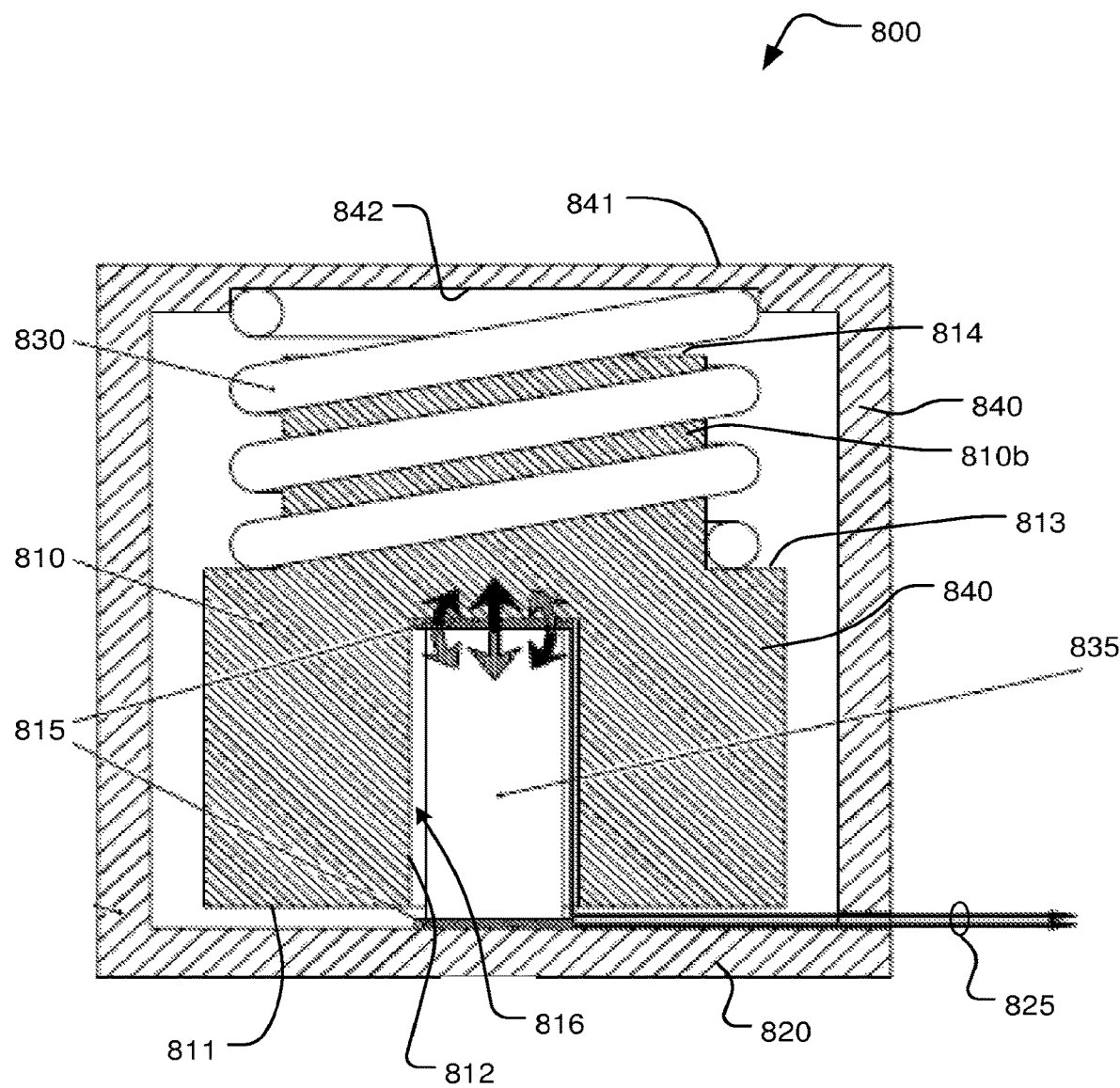
FIG. 8 is a schematic cross-sectional representation of a vibration sensor according to some embodiments.

Referring now to FIG. 8, a schematic cross-sectional representation of a vibration sensor 800 is shown and described in further detail. The vibration sensor 800 operates on a similar basis to sensor 500, in that vibration sensor 800 has a sensor base 820 configured to abut or otherwise be positioned close to the flow tube 310 for receiving vibrations propagated from upstream (or downstream) conduits into the material of flow tube 310. The sensor base 820 is arranged to propagate vibrational movement of a piezoelectric transducer 835 in response to the received vibrations. A seismic weight 810 is positioned on an opposite side of the piezoelectric transducer 835 from the sensor base 820. Since the seismic weight 810 tends to remain relatively still due to its inertia, the piezoelectric transducer 835 is squeezed (between the seismic weight 810 and the sensor base 820) by small compressions and bending moments arising from vibrations transmitted through the sensor base 820. Such small compressions and bending moments result in a detectable current through (or voltage across) the piezoelectric transducer 835. This current is detected as time varying electrical signals that can be sensed as an electrical output via conductors 825 that are coupled to electrodes 815 positioned on the piezoelectric transducer 835.

The difference of vibration sensor 800 relative to vibration sensor 500 is that a variable compression element is employed in vibration sensor 800, whereas an affixing shaft 530 is used in sensor 500, which applies a static compression. This compression element may be in the form of a spring 830, for example, that is arranged to exert a force on the seismic weight 810, in order to place the piezoelectric transducer 835 in compression, as a rest state (i.e. when movement due to vibrations does not occur). The effect of having the piezoelectric transducer 835 in compression in a rest state provides for improved signal output quality detected on conductors 825 (as the electrical output of the piezoelectric transducer 835) when vibration does occur.

The compression element may take various forms, but can include the spring 830 in the form of a coil spring, or may take other forms of spring, such as one or more leaf springs or a wave type spring (930, FIGS. 9 and 10), provided that the compression element acts to bias the seismic weight onto the piezoelectric transducer 835. In some embodiments, the compression element may include one or more clamps or biasing devices arranged to provide a spring-like resilient biasing force on the seismic weight 810 (or other seismic weight embodiments described herein) in the direction of the piezoelectric transducer 835.

In the arrangement shown in FIG. 8, the vibration sensor 800 has a sensor housing 840 that is sized and arranged to fit over the spring 830, seismic weight 810 and piezoelectric transducer 835 and to substantially enclose and/or retain those elements in place against the sensor base 820. Although not shown in FIG. 8, the housing 840 is removeably attachable to the sensor base 820 by attachment means, such as fasteners and/or clips or latches.

A top portion 841 of the housing 840 may have a registration formation 842 formed therein in order to assist in positioning (registering) the spring 830 against the top portion 841 of the housing 840. The registration formation 842 may be in the form of a recessed area (or, in other embodiments, may comprise one or more projecting portions or flanges) in order to assist in properly positioning the spring 830 to be concentric and coaxial with the seismic weight 810 and the piezoelectric transducer 835. The top portion 841 of the housing 840 also assists in providing a top bearing surface against which the spring can be braced in order to exert force against the seismic weight 810.

The seismic weight 810 may be formed to be generally cylindrical, for example, with a lower portion 810 extending over and around a substantial portion of the piezoelectric transducer 835, while leaving clearance space between a bottom surface 811 of the seismic weight 810 and the sensor base 820 against which the piezoelectric transducer 835 is biased. The clearance space allows for some degree of angular tilting of the seismic weight 810 relative to the sensor base 820 in response to certain kinds of vibrations.

The seismic weight 810 has an upper portion 810b with a top face 814 being located toward to the top portion 841 of the housing 840. The seismic weight 810 is shaped to define a bearing surface 813 at a shoulder position where the seismic weight transitions between the lower portion 810a and the upper portion 810b. The bearing surface 813 is arranged to be in contact with the lower end of the spring 830 in order to allow force from the spring to be transmitted through the seismic weight 810 and onto the piezoelectric transducer 835. The cylindrical face of upper portion 810b of seismic weight 810 is arranged to be in contact with the inside helical face of spring 830 in order to assist in properly positioning the spring 830 to be concentric and coaxial with the seismic weight 810 and the piezoelectric transducer 835.

Piezoelectric transducer 835 is preferably formed as a cylinder type transducer and may be formed of a PZT (lead zirconate titanate) or PVDF (polyvinylidene fluoride) piezoelectric material. The piezoelectric transducer 835 rests on the sensor base 820, with a disc-shaped printed circuit electrode 815 positioned between the bottom of the piezoelectric transducer 835 and an upper surface of the sensor base 820. The piezoelectric transducer 835 has a flat bottom and a flat top with a cylindrical shape in between and is held in place on a flat central area of the sensor base 820 by force applied to the upper flat end of the piezoelectric transducer 835 by the spring 830 pressing through the seismic weight 810. A second disc-shaped printed circuit style electrode 815 is located at the top of the piezoelectric transducer 835 and may be the only thing separating the flat top surface of the piezoelectric transducer 835 and the corresponding flat recessed inner surface of the seismic weight 810 that bears down upon the piezoelectric transducer 835.

A cavity is formed in the lower part 810a of the seismic weight 810 and defined by an inner cylindrical wall 812 of the seismic weight 810. The cavity is coaxial and concentric with cylindrical parts of the seismic weight 180. The cavity is sized to receive most (more than half, for example between about 50-95%, optionally about 75-90%) of the length of the piezoelectric transducer 835 but less than all of its length, while allowing a slight gap between the cylindrical wall 812 and the cylindrical outer surface of the piezoelectric transducer 835. This slight gap 816 may have a radial width of about 0.2 mm to about 0.9 mm, for example, in order to allow room for a conductor to pass down one side of the piezoelectric transducer 835 from the top electrode 815. In some embodiments, the gap 816 may be around 0.7 mm in regions where the conductor 825 is not present. The gap 816 does also allow for an insulating layer between the cylindrical outer surface of piezoelectric transducer 835 and the cylindrical wall 812 of the seismic weight 810.

The dimensions of the electrodes 815 at the top and bottom of the piezoelectric transducer 835 are selected to be thin, and at the top electrode not radially larger than the piezoelectric transducer 835 (other than by a small margin of say 0.5 mm). The carrier material (i.e. a flexible substrate for carrying printed circuits or a thin fibre board commonly used for PCBs) of the electrodes 815 is selected to have electrical insulating properties, in order to avoid current passing between the piezoelectric transducer 835 and the sensor base 820. In alternative embodiments, different kinds of electrodes can be employed as electrodes 815 and insulating properties can be provided by a separate thin insulating layer, rather than by the insulating material that carries the conducting parts of the electrodes 815.

Figure 9:
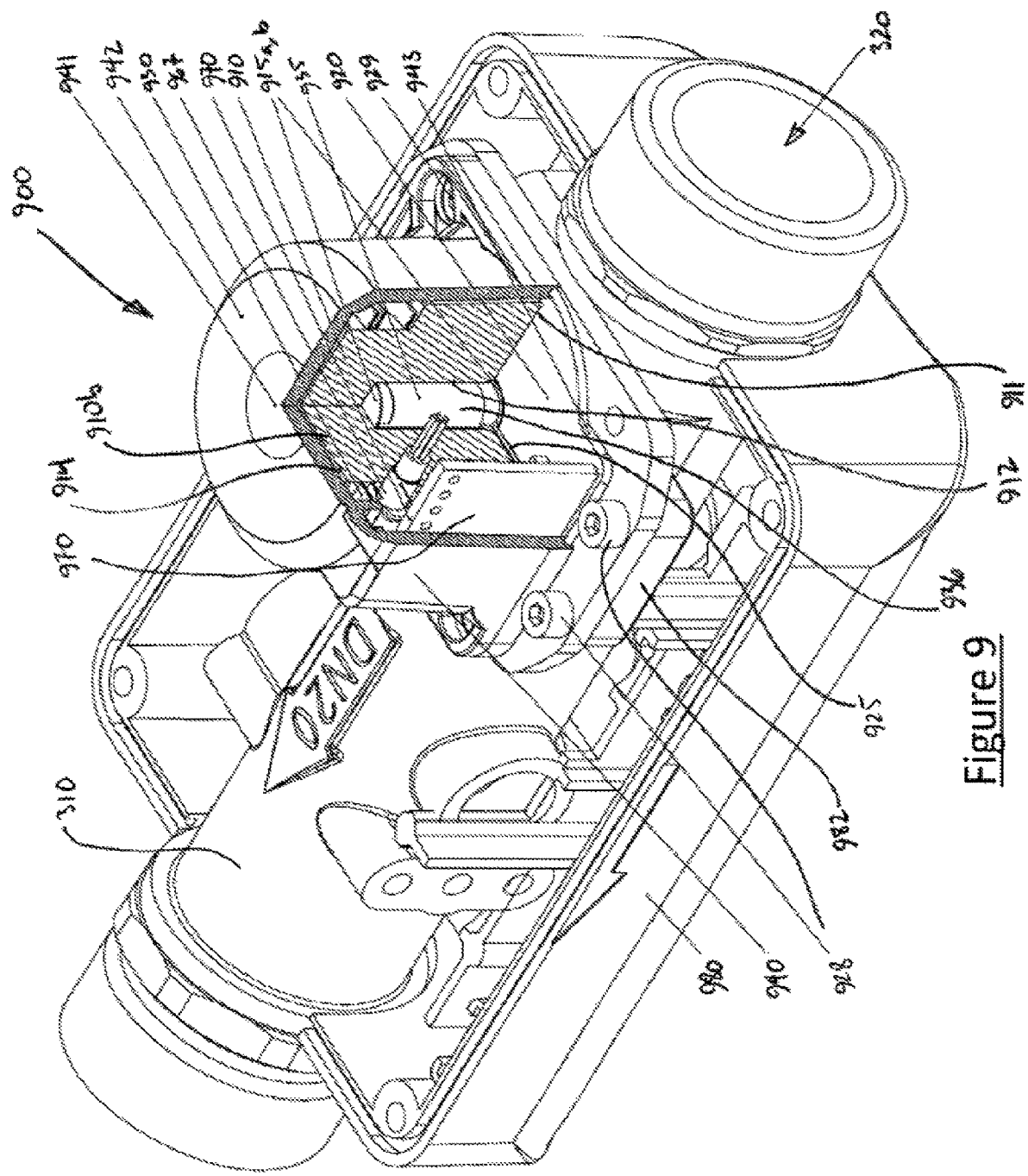
FIG. 9 is a perspective partial cut-away view of a vibration sensor according to some embodiments, where the sensor is positioned in relation to a fluid conduit forming part of a fluid meter assembly.
Figure 10:
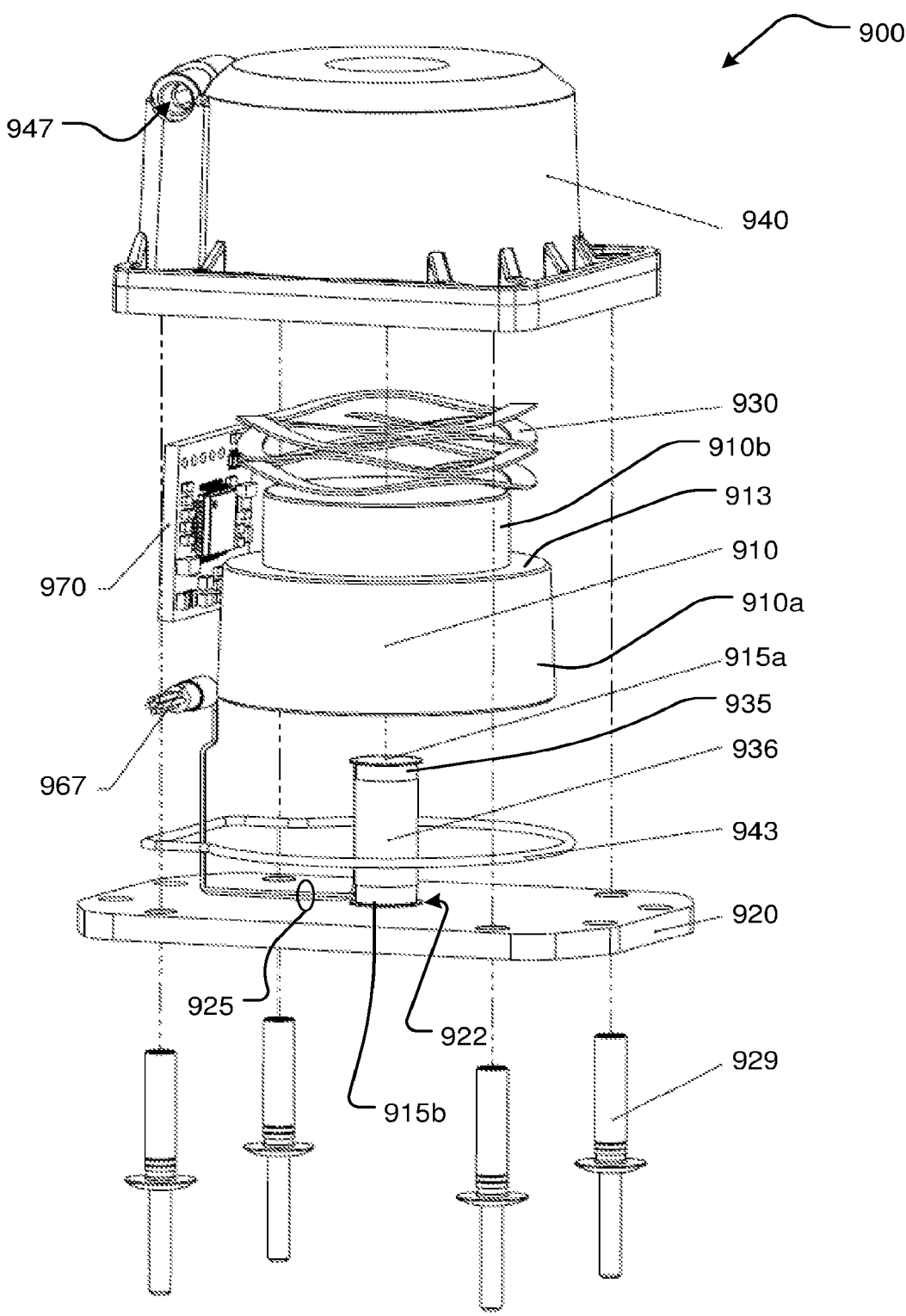
FIG. 10 is an exploded perspective view of the vibration sensor shown in FIG. 9.

FIGS. 9 and 10 illustrate embodiments of a vibration sensor 900 that is suited to be installed within a water meter assembly housing 980 so as to be able to sense vibrations propagating in the fluid conduit 310 of the water meter assembly 100. The vibration sensor 900 operates in a substantially similar way to vibration sensor 800 in that it uses a biasing element to press the seismic weight 910 downwardly on to the piezoelectric transducer 935, so that the piezoelectric transducer 935 is compressed between the seismic weight 910 and a sensor base 920. However, vibration sensor 900 is different from vibration sensor 800 in that it uses a wave spring 930 as the biasing element, and in that the vibration sensor 900 comprises a dedicated local processing unit, for example in the form of a PCB (printed circuit board) 970 located within the housing 940, in order to provide the functions of the processing unit 150. In other words, the PCB 970 is configured to receive the output signals from conductor 925 that are coupled to receive electrical outputs from the piezoelectric transducer 935, and to amplify, filter and process such output in order to determine whether the sensor vibrations indicate the presence of a fluid leak upstream of the position of the vibration senor 900. Such a local processing unit arrangement may also be employed with embodiments of vibration sensor 800.

The positioning of the PCB 970 within the housing 940 allows the vibration sensor 900 to be provided as a standalone unit for ready assembly into the meter assembly housing 980. The sensor is configured to be mounted onto a mounting plate 982 of the fluid conduit 310 so that the sensor base 920 can receive vibrations propagated through the mounting plate 982. The mounting plate 982 is formed as a flattened section extending generally tangentially to the diameter of the fluid conduit 310 and providing a flat mounting surface through which vibrations propagating into fluid conduit 310 can be readily transmitted into sensor base 920 when the sensor base 920 is mounted thereto in a parallel and abutting arrangement.

In various embodiments, the vibration sensor according to embodiments described herein can be coupled as a standalone device to another device that is not a water meter. For example, the vibration sensors described herein may be coupled with a data-logger and put into service independently of a meter or flow cell.

FIG. 9 additionally shows mounting fasteners 928 to couple the sensor base 920 to the mounting plate 982, as well as further fasteners 929 (coupling fasteners) to couple the vibration sensor housing 940 onto the sensor base 920.

The piezoelectric transducer 935 is similar to piezoelectric transducer 835 (i.e. cylinder-type PZT or PVDF), except that an insulating material 936 has been wrapped around the main portion of the cylindrical body of the piezoelectric transducer 935. The insulating material 936 serves to reduce the potential for electric charge transmitting from the piezoelectric transducer 935 to the seismic weight inside the cavity defined by the inner wall 912 of the seismic weight 910. The insulating material 936 is arranged to cover the conductor 925 that extends from the top electrode 915a downward along the cylindrical side of the piezoelectric transducer 935.

A further difference of vibration sensor 900 over vibration sensor 800 is that a sealing ring 943 is positioned between the housing 940 and base plate 920 in order to seal the chamber defined between the housing 940 and the sensor base 920 against ingress of particulates or moisture.

An output wire bundle and/or connector 967 is coupled to the PCB 970 in order to provide data to an external device and receive power and control signals therefrom. The output wire bundle/connector 967 comprises 5 wires (though in different embodiments this number can be different) that are bundled together in an outer jacket of insulating material, that can also be used to act as a sealing cable gland to exit housing 940. The output wire bundle may be terminated in the connector to facilitate connection to a board or a compatible connector in the water meter, without requiring soldering or the like. As shown in FIG. 10, conductors 925 are coupled directly to an analogue front end 1310 (FIG. 13) on the PCB 970, and the output wire bundle/connector 967 is coupled to a micro-controller 1320 (FIG. 13) carried by the PCB 970 and arranged to allow communication between the vibration sensor 900 and an external device.

Figure 11:
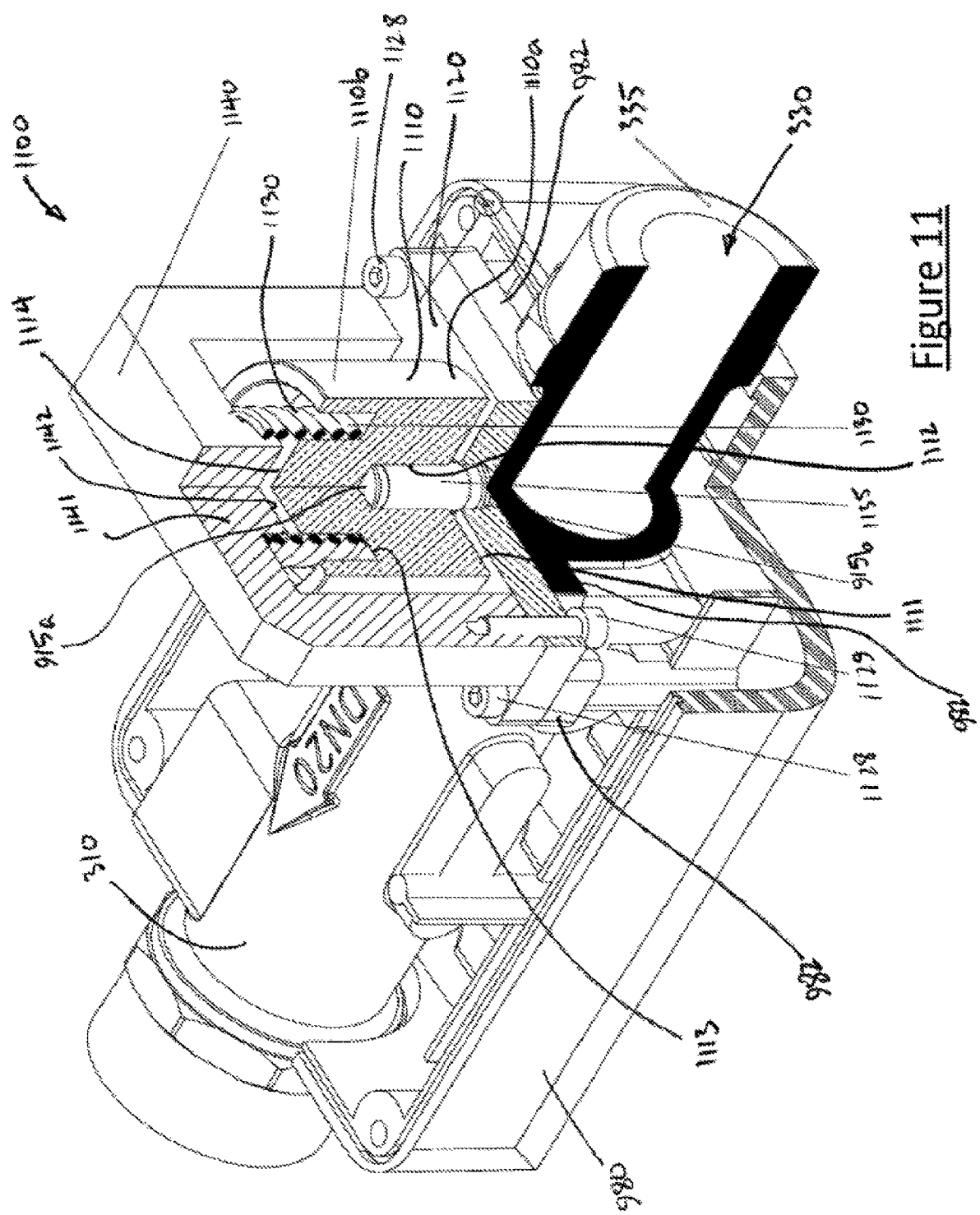
FIG. 11 is a perspective partial cut-away view of a vibration sensor according to further embodiments, shown positioned in relation to a fluid conduit of a fluid meter assembly.

FIG. 11 illustrates embodiments of a vibration sensor 1100 that is suited to be installed within a water meter assembly housing 980 so as to be able to sense vibrations propagating in the fluid conduit 310 of the water meter assembly 100. The vibration sensor 1100 operates in a substantially similar way to vibration sensor 900 in that it uses a biasing element to press the seismic weight 1110 downwardly on to the piezoelectric transducer 1135 (which may be the same as the piezoelectric transducer 935), so that the piezoelectric transducer 1135 is compressed between the seismic weight 1110 and a sensor base 1120. However, vibration sensor 1100 is different from vibration sensor 900 in that it uses a coil spring 1130 as the biasing element. Although not shown in FIG. 11, the vibration sensor 1100 may comprise a PCB 970 (as shown and described in relation to FIGS. 9 and 10) located within a part of a bracket 1140 (that functions as a partial housing) and configured to provide the functions of the processing unit 150. Sensor 1100 may comprise a similar conductor and output wire bundle/connector arrangement as is described and shown in relation to vibration sensor 900.

Additionally, vibration sensor 1100 differs from vibration sensor 900 in that it has a seismic weight 1110 of a different configuration and a top portion 1141 of the bracket 1140 has a downwardly projecting boss as the registration formation 1142 for positioning the biasing element (spring 1130). A further difference lies in the sensor base 1120 having a central recessed area that is recessed from a flat upper surface of the sensor base 1120. The central recessed area is sized to receive an electrode 915*b* and a lower part (e.g. a lower 10-30%) of the piezoelectric transducer 1135.

The seismic weight 1110 has a generally similar configuration to seismic weight 910, with an upper face 1114 spaced from the bracket top portion 1141, a lower face 1111 spaced from the sensor base 1120, a lower portion 1110*a* having an inner wall 1112 defining a cavity to receive the piezoelectric transducer 1135, and an upper portion 1110*b*. The upper portion 1110*b* defines an annularly recessed area with a bearing surface 1113 that defines a surface against which a lower end of the spring 1130 can exert a downward force. The inner cylindrical face of the annular recessed area of upper portion 1110*b* is arranged to be in contact with the inside helical face of spring 1130 in order to assist in properly positioning the spring 1130 to be concentric and coaxial with the seismic weight 1110 and the piezoelectric transducer 1135.

The sensor 1100 is configured to be mounted onto a mounting plate 982 of the fluid conduit 310 so that the sensor base 1120 can receive vibrations propagated through the mounting plate 982. The mounting plate 982 is formed as a flattened section extending generally tangentially to the diameter of the fluid conduit 310 and providing a flat mounting surface through which vibrations propagating into fluid conduit 310 can be readily transmitted into sensor base 1120 when the sensor base 1120 is mounted thereto in a parallel and abutting arrangement.

FIG. 11 additionally shows mounting fasteners 1128 to couple the sensor base 1120 to the mounting plate 982, as well as further fasteners 1129 (coupling fasteners) to couple the vibration sensor housing 1140 onto the sensor base 1120.

Vibration sensor 1100 differs from vibration sensor 900 in that bracket 1140 does not define an enclosed space and functions mainly as a means of securing and positioning the spring 1130 to bias downwardly on the seismic weight 1110.

The piezoelectric transducer 1135 may be substantially similar to piezoelectric transducer 935 (i.e. cylinder-type PZT or PVDF), with an insulating material 936 wrapped around the main portion of the cylindrical body of the piezoelectric transducer 1135. The insulating material 936 is arranged to cover the conductors (not shown in FIG. 11) that extend from the top electrode 915*a* downward along the cylindrical side of the piezoelectric transducer 1135.

Other than the differences noted above, the vibration sensor 1100 is substantially similarly configured and operates substantially similarly to vibration sensor 500, 800, and 900 as described herein.

FIGS. 12A, 12B, 12C and 12D illustrate further embodiments of a vibration sensor 1200 that is suited to be installed within a water meter assembly housing 980 so as to be able to sense vibrations propagating in the fluid conduit 310 of the water meter assembly 100. The vibration sensor 1200 operates in a substantially similar way to vibration sensors 800, 900 and 1100 in that it uses a biasing element to bias the seismic weight 1210 downwardly on to a piezoelectric transducer 1235 (which may be the same as the piezoelectric transducer 835 or 935), so that the piezoelectric transducer 1235 is compressed between the seismic weight 1210 and a sensor base 1220. However, vibration sensor 1200 is different from vibration sensor 900 in that it uses a coil spring 1230 as the biasing element and because the coil spring 1230 is arranged to pull the seismic weight 1210 toward the sensor base 1220 and onto the piezoelectric transducer 1235.

Although not shown in FIGS. 12A-12D, the vibration sensor 1200 may comprise a PCB 970 (as shown and described in relation to FIGS. 9 and 10) located within a part of a housing (not shown but functionally similar to housing 840, 940 or 1140) and configured to provide the functions of the processing unit 150. Sensor 1200 may comprise a similar conductor and output connector arrangement as is described and shown in relation to vibration sensor 900, for example including conductors 925 coupled at one end to top and bottom printed circuit electrodes 1215*a*, 1215*b* and coupled at an opposite end to an electrical connector 967 that can couple to a PCB 970 or another external processing device.

Vibration sensor 1200 may anchor the spring 1230 to the sensor base 1220 and the seismic weight 1210 by fasteners, such as screws 1231, or other anchoring means. An adjustable set screw 1232 is positioned in an axial bore through the seismic weight 1210. The set screw 1232 can be manually adjusted to push (or not push) the seismic weight axially away from the piezoelectric transducer 1235, via a free movable spacer 1233 that is disposed within the axial bore in between the set screw 1232 and the piezoelectric transducer 1235, to allow the spring 1230 to be placed under more (or less) tension and thereby apply more (or less) force to push the seismic weight 1210 onto the piezoelectric transducer 1235 applying compression thereto. The set screw 1232 may be substantially fixed in position.

The seismic weight 1210 is different from seismic weight 835, 935 and 1135 in that it does not receive the piezoelectric transducer 1235 within an internal cavity. Instead, that cavity is defined by a part of the sensor base 1220. The seismic weight 1210 needs to be axially aligned and generally axisymmetric and coaxial/concentric with the piezoelectric transducer 1235 and give provision for the seismic weight 1210 to be coupled to a suitable biasing element, such as spring 1230. The sensor base 1220 needs to be axisymmetric with the piezoelectric transducer 1235 and the seismic weight 1210 so it can efficiently transmit to the piezoelectric transducer 1235 vibrations from a surface it is coupled to.

Figure 12:
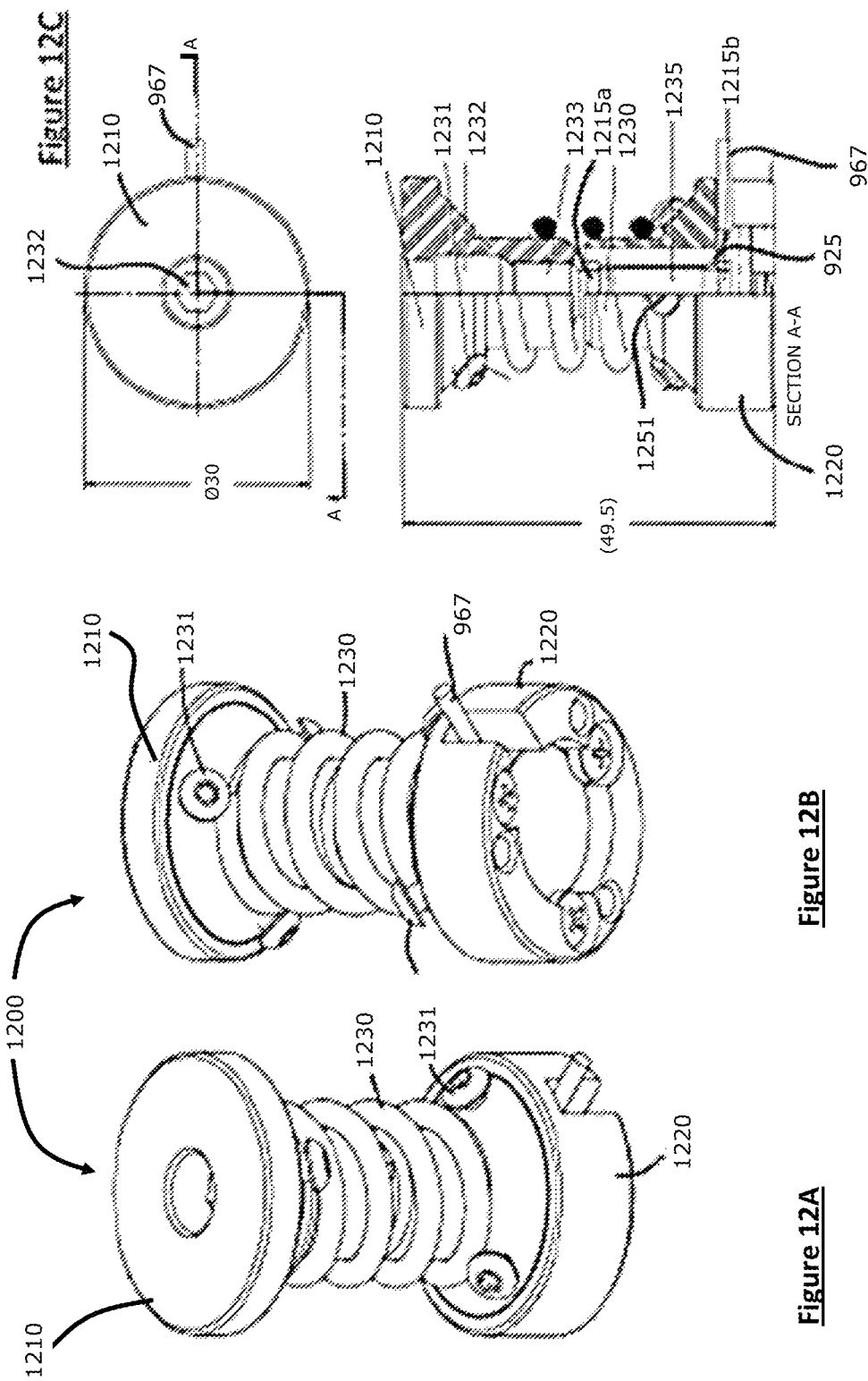
FIG. 12A is a top perspective view of a vibration sensor according to further embodiments.
FIG. 12B is a bottom perspective view of the vibration sensor of FIG. 12A.
FIG. 12C is a top view of the vibration sensor of FIG. 12A.
FIG. 12D is a side elevation view of the vibration sensor of FIG. 12A, shown in partial cross-section taken along line A-A of FIG. 12C.

Vibration sensors 800, 900, 1100 and 1200 operate according to similar principles to vibration sensor 500 in that all such sensors rely on the combination of a piezoelectric transducer positioned in between a sensor base and a seismic weight, with all of those three key elements being axially aligned. There is at least one conductor coupled to the piezoelectric transducer. Embodiments may use two such conductors. The sensor base, the piezoelectric transducer and the seismic weight are arranged so that relative movement between the sensor base and the seismic weight arising from a vibration source through the sensor base causes a current to be generated in the piezoelectric transducer and an output signal corresponding to the generated current is then detectable on the at least one conductor. In vibration sensor embodiments 500, 800, 900, 1100 and 1200, the seismic weight 510, 810, 910, 1110, 1210 is preferably generally axisymmetric and is coaxial and concentric with the piezoelectric transducer 535, 835, 935, 1135, 1235 about the same central (longitudinal) axis defined through the centre of the piezoelectric sensor. Thus, the seismic weight 510, 810, 910, 1110, 1210 preferably has a round profile in plan view (e.g. as seen in FIG. 12C).

In the embodiment of vibration sensor 1200, the seismic weight 1210 is connected to the sensor base 1220, in this case by the spring 1230. On the other hand, other embodiments, such as vibration sensors 800, 900, 1100, do not have the seismic weight and the sensor base connected to each other; rather, they are held in position relative to each other by the housing. The variable compression using a flexible biasing element in sensors 800, 900, 1100 and 1200, versus the static compression using the pre-load of the affixing shaft 530 in sensor 500 assists in achieving increased sensitivity in detecting vibrations.

Other than the differences noted above, the vibration sensor 1200 is substantially similarly configured and operates substantially similarly to vibration sensors 800, 900 and 1100 as described herein.

Figure 13:
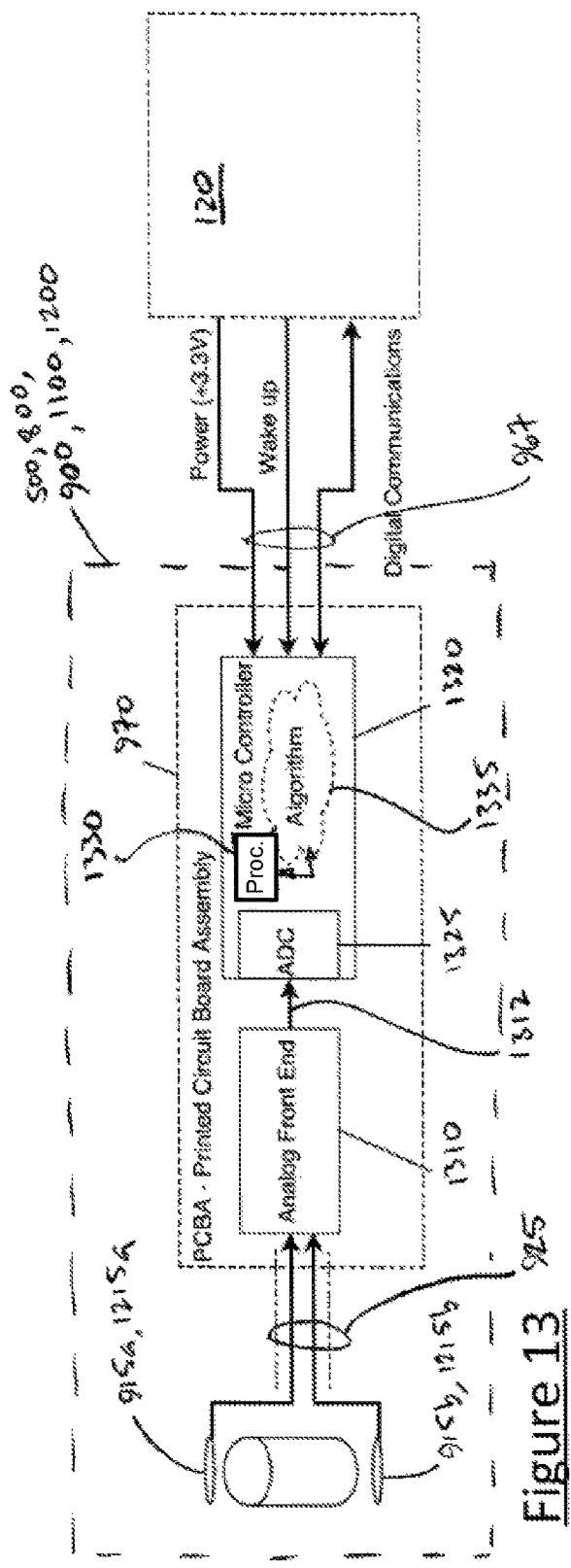
FIG. 13 is a schematic diagram of electrical components of vibration sensors according to various embodiments, shown in communication with a separate processing device of a fluid meter assembly.
Figure 14:
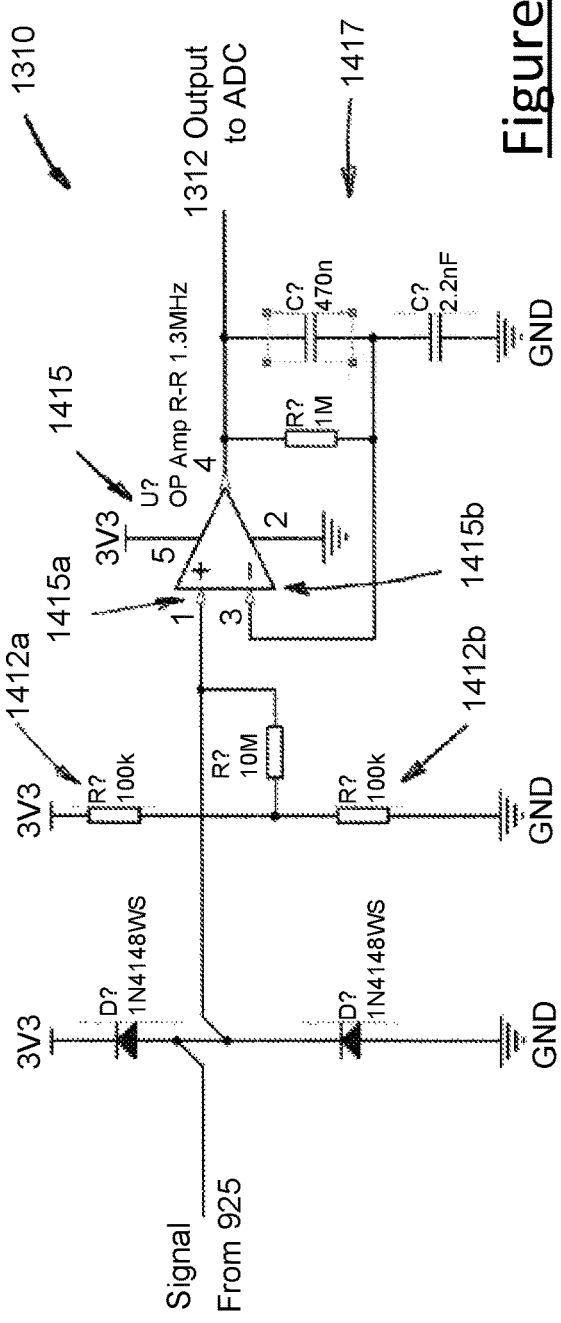
FIG. 14 is a schematic circuit diagram of analogue front-end circuitry for conditioning output signals received from a piezoelectric transducer of the vibration sensor of some embodiments.

Referring now to FIGS. 13 and 14, the electrical arrangement employed in the vibration sensors 800, 900, 1100 and 1200 are described in further detail. Current and/or voltage signals detected via electrodes 815, 915, 1115, 1215 on the piezoelectric transducer are received at analogue front end circuitry 1310 by conductors 925. The analogue front end circuitry 1310 provides a half rail offset and amplifies signals in the frequency region of interest (i.e. up to 1 kHz, and possibly up to 4 kHz in some embodiments), while only using a single side supply. To achieve this, the signals received via conductors 925 are first biased with large value pull-up and pull-down resistors 1412a, 1412b and are then fed into the positive terminal 1415a of an operational amplifier 1415. The negative terminal 1415b of the operational amplifier 1415 is driven by the output of the operational amplifier 1415 that has been first fed through a low-pass filter 1417. Because of the inverse nature of the feedback-gain relationship, the analogue front end circuitry (AFE) 1310 achieves an overall response of 1 for all DC signals (consisting only of the DC off-set introduced by the biasing resistors) and a gain that rapidly approaches a configurable amount for frequencies above DC.

Output signals 1312 from the analogue front end circuitry 1310 are received at an analogue-to-digital converter (ADC) 1325 that may form part of microcontroller 1320 forming part of the PCB 970 or may be separate from and connected to the microcontroller 1320. Thus, the amplified and filtered signals received on conductors 925 are converted by the ADC 1325 into digital signals that are stored in a memory 1335 of the microcontroller 1320. The memory 1335 may comprise flash memory and random access memory (RAM), for example. An example microcontroller that can be used as microcontroller 1320 is the STM32F091RB microcontroller from STMicroelectronics™, for example.

The ADC 1325 samples the analogue output of the AFE 1310 at a sampling rate that is twice the maximum frequency of interest during a predetermined sampling time period (set as a configuration parameter of the microcontroller 1320). The predetermined sampling time period may be set as the number of FFT sample frequencies divided by the sampling rate. Timer functions of the microprocessor 1330 can be used for controlling the ADC sampling interval. The predetermined sampling time period may be in the range of between around 0.05 seconds to about 1.0 second, optionally about 0.05 seconds to about 0.2 seconds, for example. In some embodiments, the predetermined sampling time period may be about 0.1 seconds, for example.

The sampled signals from the AFE 1310 are output from the ADC 1325 to a processor 1330 in the microcontroller 1330 and are stored as digitised samples in memory 1335. The digitised samples are processed by the processor 1330 executing a frequency analysis algorithm stored in a non-transitory part (i.e. flash) of the memory 1335 of the microcontroller 1320. This algorithm involves the processor 1330 performing a calculation of a fast Fourier transform (FFT) on the stored digitized samples. Using the complex values of the results from the FFT calculations performed by the processor 1330, the magnitude of each one of the complex amplitudes at each sampled frequency is then stored by the processor 1330 in an array in the memory 1335. The processor 1330 then scans the array of amplitude values to compare the amplitude values for specific frequency bands with predefined amplitude thresholds (stored in memory 1335) for those bands. If the magnitude in one or more specific frequency bands is above the predefined thresholds for the respective band and the amplitude thresholds of any other bands matching a certain frequency profile of a particular kind of fluid leak, then the microcontroller 1320 sets an alarm flag or indication to indicate that the sensed vibrations indicate the presence of a fluid leak in the vicinity of the vibration sensor 900.

In some embodiments, the processor 1330 performs a single set (one or more) of comparisons to look for a specific frequency pattern associated with a known (previously experimentally determined, machine learned or otherwise determined) frequency signature for a particular leak. This set of comparisons may involve comparing the detected amplitude in a single frequency band against a single threshold amplitude value or it may involve comparing the detected amplitude in multiple frequency bands against multiple respective threshold amplitude values. In some embodiments, the processor 1330 performs a series of comparisons in order to compare the sample data against a series of different frequency profiles associated with a series of distinct kinds of fluid leaks. In some embodiments, multiple threshold amplitude values may be applied to the same frequency band, for example where an amplitude above a lower threshold may indicate the likely presence of a leak and an amplitude above a higher amplitude in the same frequency band may indicate a leak of a certain magnitude (e.g. above a 3 mm diameter hole in a conduit within 10 metres from the location of the vibration sensor).

Once the processor 1330 determines that an alarm flag is to be set, then the processor 1330 stores an appropriate indication of this in memory 1335 and then prepares an output data payload for storage and/or immediate transmission to the external device 120 via output connector 967. The output data payload includes timing information, such as a timestamp of when the vibration sensor signals were received, any operational status indicators as to the functioning of the PCB 970 and optionally an indication of the type of leak detected (if the vibration sensor is configured to detect more than one leak type). In some embodiments, the data payload may include the stored array of amplitude values of the received signals at each frequency within the range of interest. The processor 1330 is configured to receive power (e.g. 3.3 V DC) via the connector 967 and to receive commands, such as an operation (e.g. wake-up) command. Serial communications between the PCB 970 and the external unit 120 may also be provided by connector 967.

In some embodiments, the processor 1330 may effectively perform a rough analysis of the received signals to flag a possible leak or other condition, and the data payload may be provided to an external processing device, such as a server 210, so that a final (or possible more accurate) determination can be made about the possible presence of a leak in the vicinity of the vibration sensor. For example, the server 210 may use data payloads received from multiple vibration sensors to determine the likely presence or absence of a leak. If the server 210 receives multiple alarm flags from meters or other devices coupled to neighbouring or closely spaced vibration sensors, then the server 210 may make a final determination that a leak exists in the vicinity of such vibration sensors.

Figure 15A:
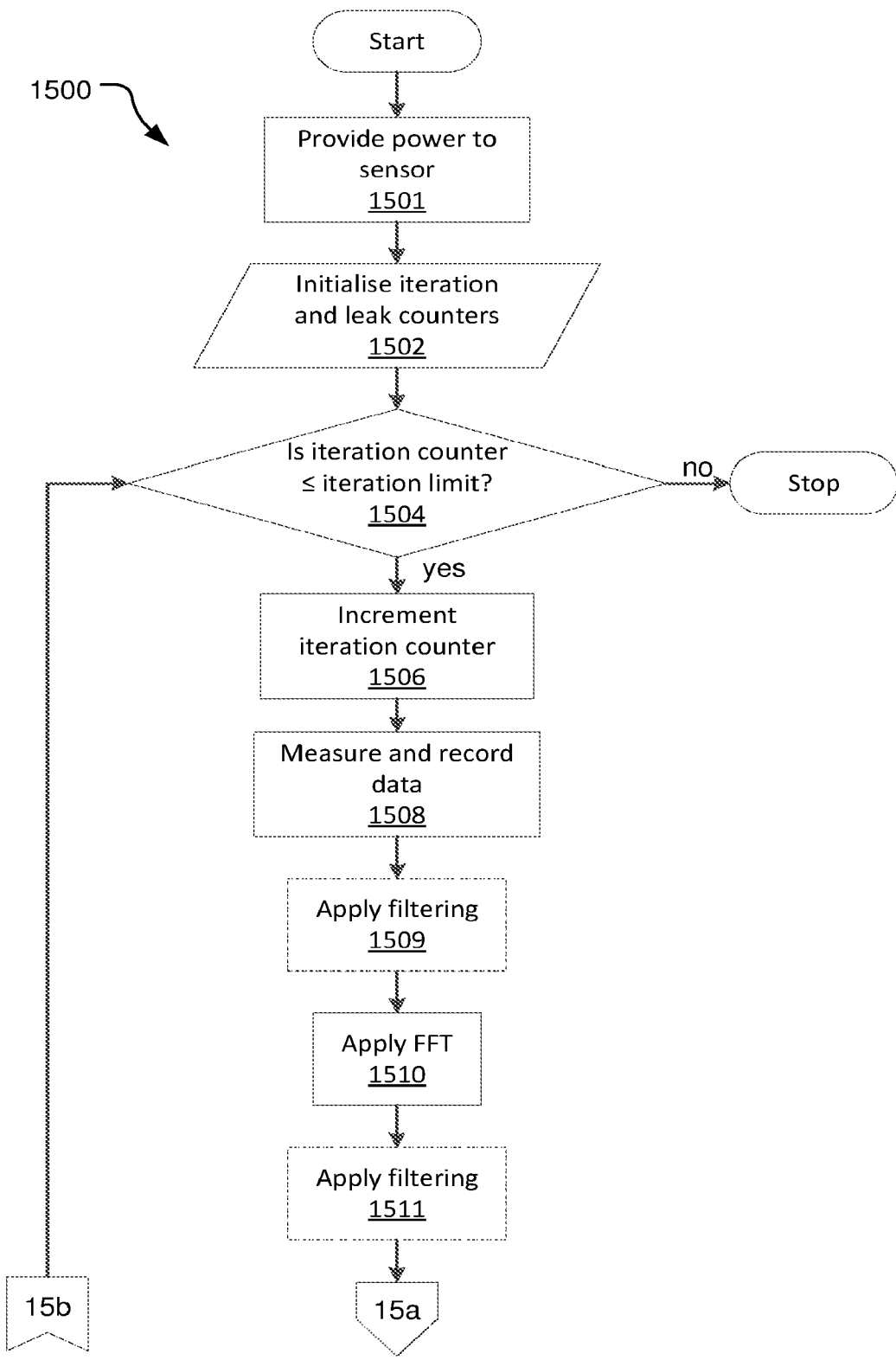
FIG. 15A is a flowchart of part of a method leak detection according to some embodiments.
Figure 15B:
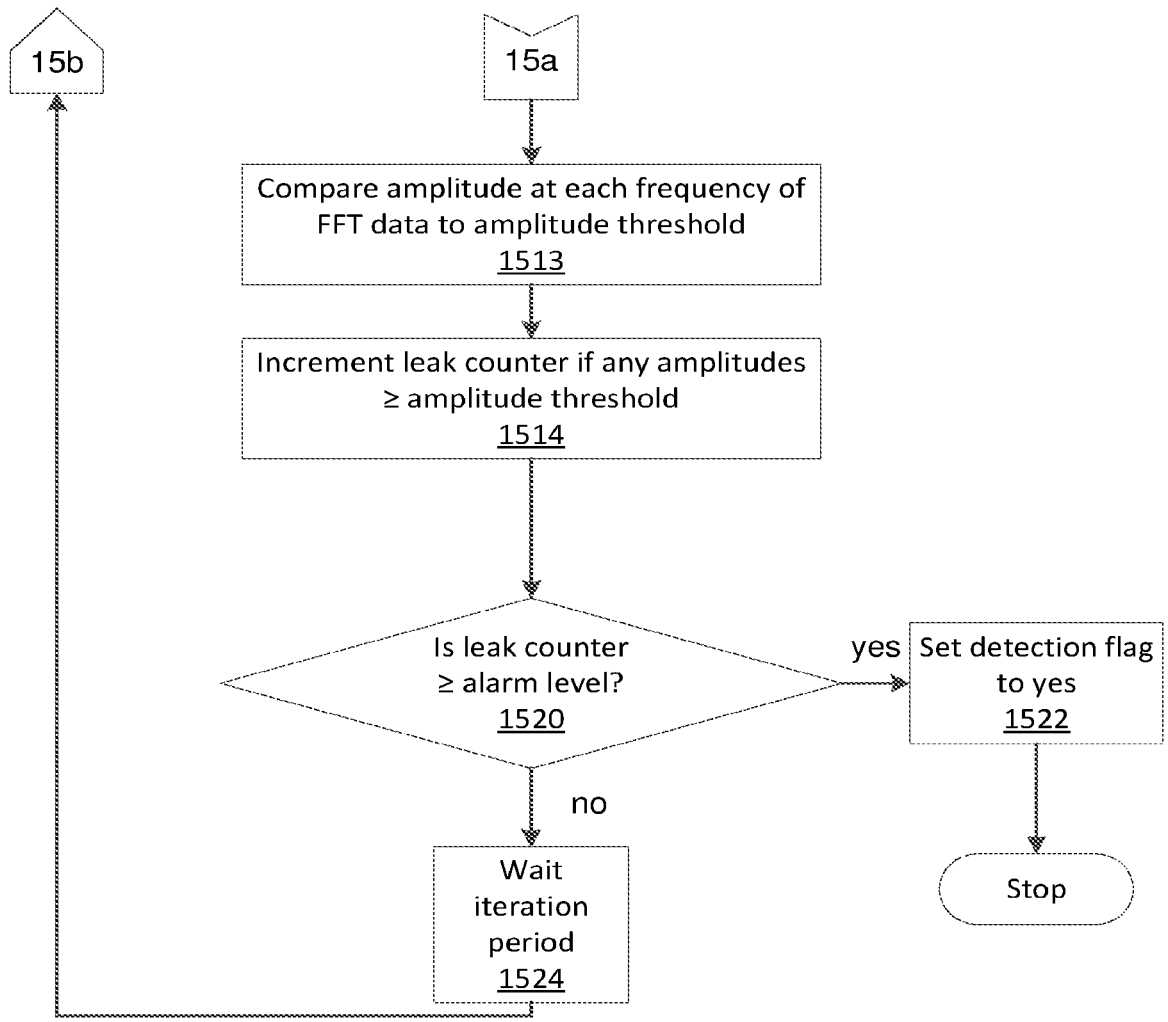
FIG. 15B is a flowchart of the rest of the method shown in FIG. 15A.

Referring to FIGS. 15A and 15B, some embodiments relate to a leak detection method 1500 using vibration sensor 500, 800, 900, 1100, 1200 and 1700 (described below). The method 1500 comprises providing power to the vibration sensor 500, 800, 900, 1100, 1200 and 1700 to enable measurements to be taken, at 1501. The method 1500 further comprises initialising an iteration counter value and a leak counter value, at 1502. For example, the iteration counter value and the leak counter value may be set by processor 151, 1330 to an initial value of 0.

At 1504, the iteration counter value is compared to a predetermined iteration limit. If the iteration counter value is less than or equal to the predetermined iteration limit, the iteration counter value is incrementally increased, at 1506. The iteration counter value may, for example, be increased by adding a value of 1 to the iteration counter value. If the iteration counter value is greater than the predetermined iteration limit, then method 1500 stops. Method 1500 may therefore be repeated a plurality of times equal to the iteration limit. The iteration limit may be set at a value between 7 and 10 iterations, for example, but can be configured to have a different value.

Vibrations propagated through fluid conduit materials from upstream locations are sensed by a piezoelectric transducer and corresponding electrical signals are received at analogue front end circuitry 1310 by conductors 925. An analogue voltage signal 1312 from the analogue front end circuitry 1310 is received and vibration data is recorded, at 1508. As discussed above, the signals may be sampled and converted into digitised data and vibration data may be stored in memory 1335. The vibration data may, for example, comprise voltage amplitude and frequency data.

In some embodiments, at least one of the iteration counter value, the leak counter value and vibration data may be stored in any one or more of memory 152, 1335, volatile memory or non-volatile memory.

The analogue voltage signal 1312 is passed through a low-pass filter to reduce or remove high-frequency signals. For example, frequencies above 1.2 kHz may be filtered out.

In some embodiments, the analogue voltage signal 1312 may be passed through a high-pass filter to reduce or remove low-frequency signals, at 1509. For example, frequencies below about 360 Hz may be filtered out.

A Fast Fourier Transform (FFT) is then applied to the recorded data to separate a set of frequency bands approximating the frequency spectrum of the low-pass filtered signals, at 1510.

In some embodiments, the FFT transformed data is filtered to remove low frequency data, at 1511. For example, frequencies below about 360 Hz may be deleted. In other embodiments, low frequency data (e.g. data relating to frequencies less than 360 Hz) may be stored but ignored when FFT is applied. In some embodiments, the FFT is applied to recorded data over a frequency range of interest. For example, the frequency range of interest may be between about 360 Hz to 1.2 kHz.

The amplitude of the FFT data at each frequency is compared to an amplitude threshold, at 1513. If a threshold number of the amplitudes in the FFT data is greater than or equal to the amplitude threshold, then the leak counter value is incrementally increased, at 1514. The leak counter value may, for example, be increased by adding a value of 1 to the leak counter value. In some embodiments, the threshold number of amplitudes required to increment the leak counter may be one amplitude, i.e. if the amplitude at any frequency is greater than or equal to the amplitude threshold, then this indicates a potential upstream (or possibly downstream) leak and the leak counter value is incremented.

The amplitude threshold may, for example, be in the range of about 200 micro-Volt seconds to about 500 micro-Volt seconds, optionally about 200 $\mu$V·s to about 400 $\mu$V·s, and optionally about 250 $\mu$V·s to about 350 $\mu$V·s. In some embodiments, the amplitude threshold is about 300 micro-Volts seconds.

In some embodiments, only the FFT data over a frequency range of interest is compared to the amplitude threshold. For example, the frequency range of interest may be between about 360 Hz to 1.2 kHz. The frequency range of interest may be divided into frequency bands of equal range, for example, 10 Hz or 20 Hz bands.

At 1520, the leak counter value is compared to an alarm level. If the leak counter value is greater than or equal to the alarm level, then a detection flag is set to a 'yes' state to indicate that a leak has been detected, at 1522. The 'yes' state may, for example, correspond to a binary flag value of 1. Method 1500 is then stopped. The requirement of a leak counter being greater than the alarm level may advantageously reduce the occurrence of false alarms being raised as the amplitude must be greater than or equal to the amplitude threshold a number of instances before an alarm is raised. In some embodiments, the alarm level may be between 3 and 10 counts, optionally between 4 and 6 counts. In some embodiments, the alarm level may be 5 counts. The alarm level is less than the iteration limit.

In some embodiments, an alarm signal may be sent to a server 210 if the detection flag is set (but before the method 1500 is stopped) to indicate that the detection flag is set. In other embodiments, the state of the detection flag is stored for later retrieval in a data payload by the server 210. The alarm signal may be sent before, after or while the detection flag is set.

If the leak counter value is less than the alarm level, then an iteration period is waited, at 1524, before returning to step 1504. The iteration period may be between about 10 and about 20 minutes, for example. In some embodiments, the iteration period is about 15 minutes.

Figure 16A:
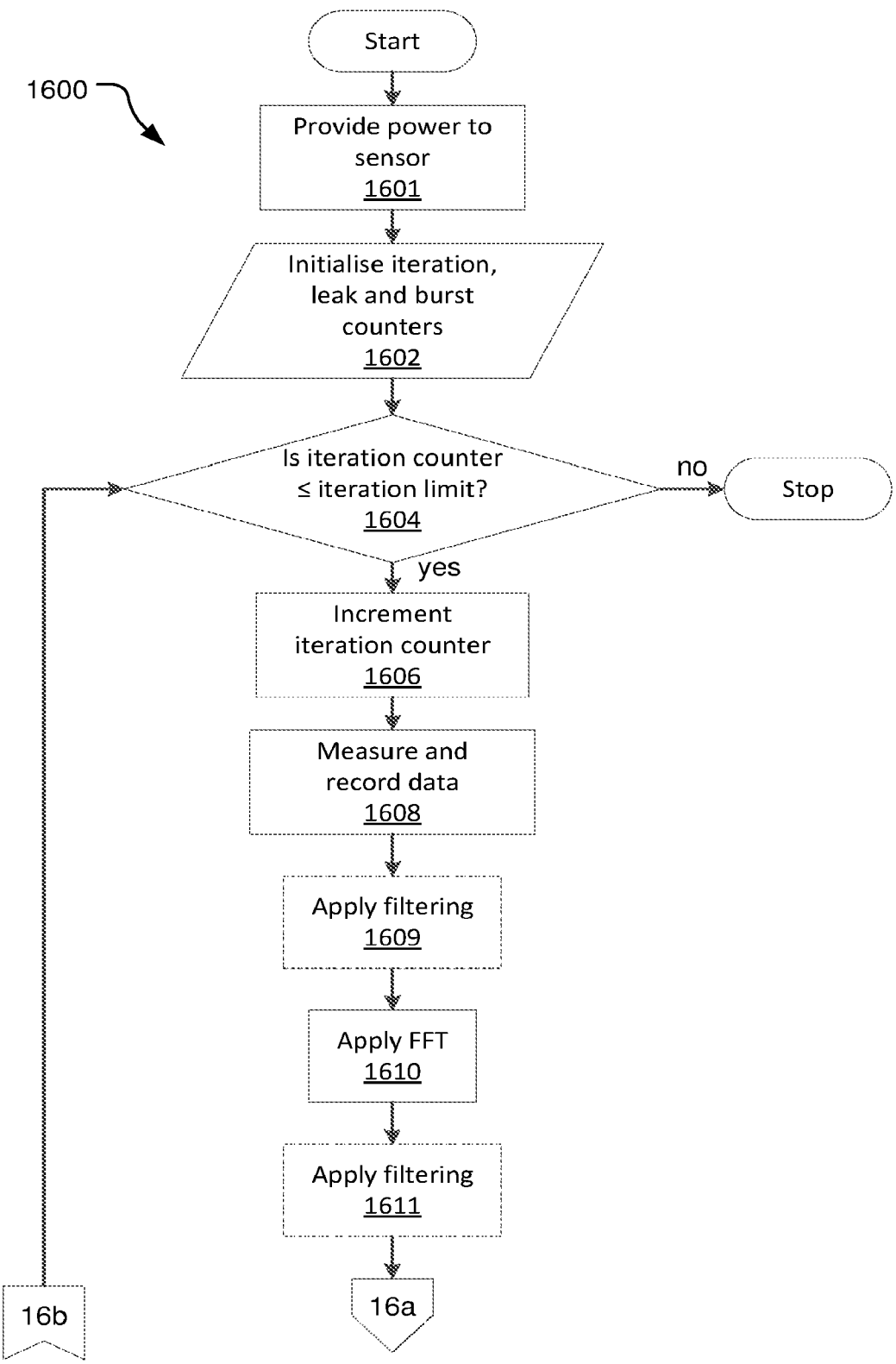
FIG. 16A is a flowchart of part of a method leak detection according to some embodiments.
Figure 16B:
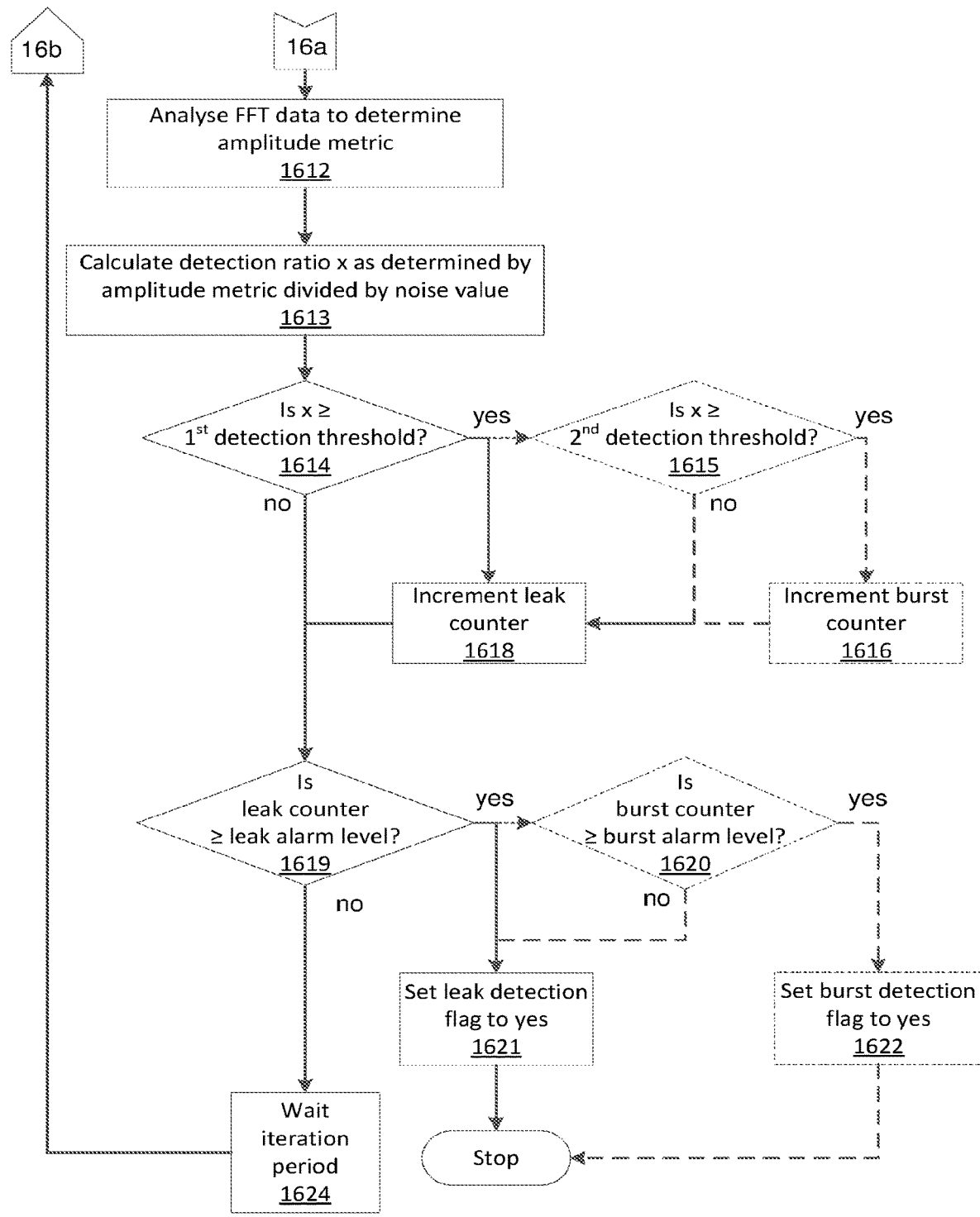
FIG. 16B is a flowchart of the rest of the method shown in FIG. 16A.
Figure 17:
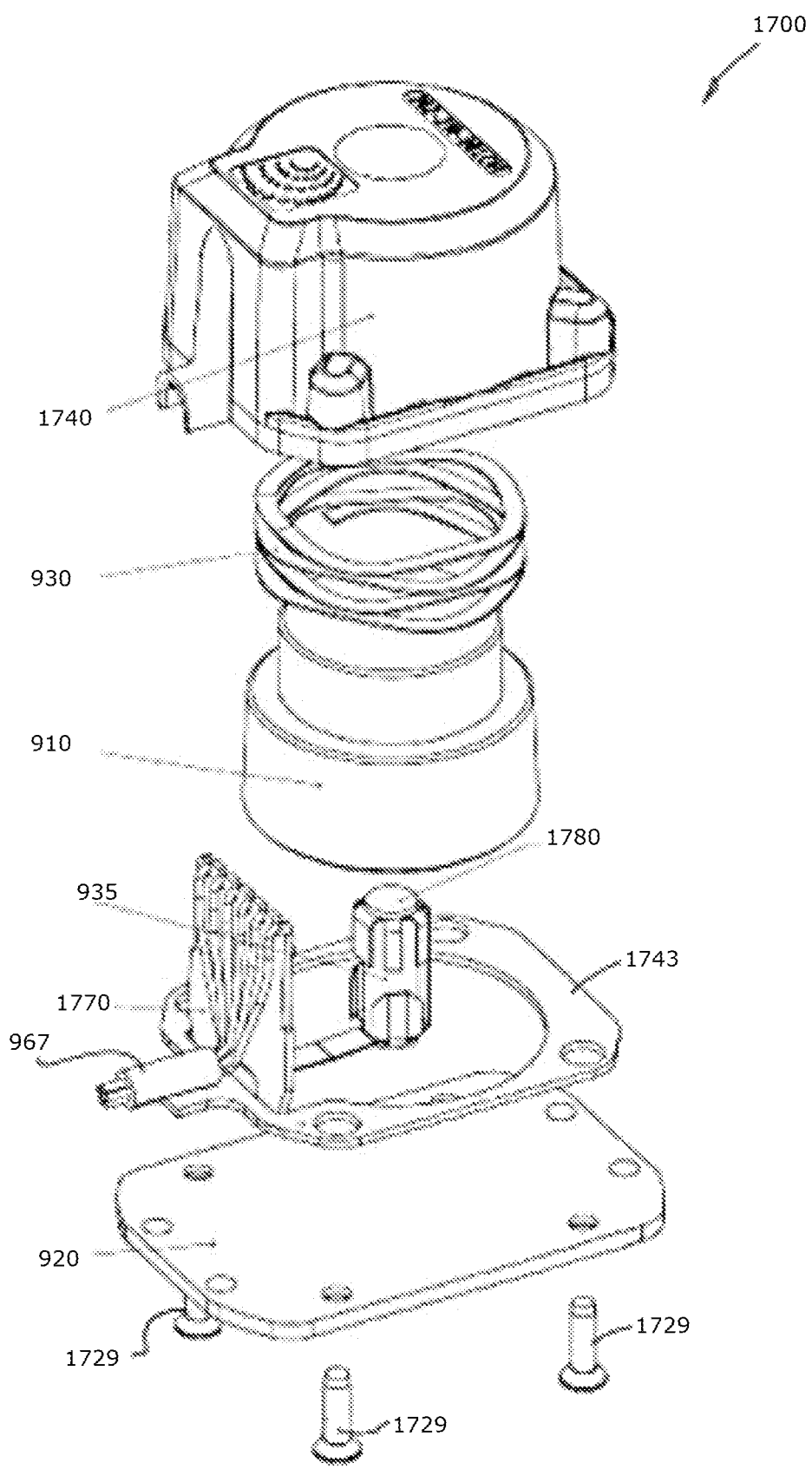
FIG. 17 is an exploded perspective view of a vibration sensor according to further embodiments.

Referring to FIGS. 16A and 16B, some embodiments relate to a leak detection method 1600 using vibration sensor 500, 800, 900, 1100, 1200 and 1700 (described below). The method 1600 comprises providing power to the vibration sensor 500, 800, 900, 1100, 1200 and 1700 to enable measurements to be taken, at 1601. The method 1600 further comprises initialising an iteration counter value, a leak counter value and in some embodiments, a burst counter value, at 1602. For example, the iteration counter value, the leak counter value and the burst counter value may be set by processor 151, 1330 to an initial value of 0.

At 1604, the iteration counter value is compared to a predetermined iteration limit. If the iteration counter value is less than or equal to the predetermined iteration limit, the iteration counter value is incrementally increased, at 1606. The iteration counter value may, for example, be increased by adding a value of 1 to the iteration counter value. If the iteration counter value is greater than the predetermined iteration limit, then method 1600 stops. Method 1600 may therefore be repeated a plurality of times equal to the iteration limit. The iteration limit may be set between 7 and 10 iterations, for example, but can be configured to have a different value.

Vibrations propagated through fluid conduit materials from upstream locations are sensed by a piezoelectric transducer and corresponding electrical signals are received at analogue front end circuitry 1310 by conductors 925. An analogue voltage signal 1312 from the analogue front end circuitry 1310 is received and vibration data is recorded, at 1608. As discussed above, the signals may be sampled and converted into digitised data and vibration data may be stored in memory 1335. The vibration data may, for example, comprise voltage amplitude and frequency data.

In some embodiments, at least one of the iteration counter value, the leak counter value, the burst counter value and vibration data may be stored in any one or more of memory 152, 1335, volatile memory or non-volatile memory.

The analogue voltage signal 1312 is passed through a low-pass filter to reduce or remove high-frequency signals. For example, frequencies above 1.2 kHz may be filtered out.

In some embodiments, the analogue voltage signal 1312 may be passed through a high-pass filter to reduce or remove low-frequency signals, at 1609. For example, frequencies below about 360 Hz may be filtered out.

A Fast Fourier Transform (FFT) is then applied to the recorded data to separate a set of frequency bands approximating the frequency spectrum of the low-pass filtered signals, at 1610.

In some embodiments, the FFT transformed data is filtered to remove low frequency data, at 1611. For example, frequencies below about 360 Hz may be deleted. In other embodiments, low frequency data (e.g. data relating to frequencies less than 360 Hz) may be stored but ignored when FFT is applied. In some embodiments, the FFT is applied to recorded data over a frequency range of interest. For example, the frequency range of interest may be between about 360 Hz to 1.2 kHz.

The FFT data may be analysed to calculate an amplitude metric at 1612. The amplitude metric may be calculated over a frequency range of interest. For example, the frequency range of interest may be between about 360 Hz and 1 kHz or 360 Hz and 1.2 kHz. The amplitude metric represents the power or strength of the sensed signal.

In some embodiments, the amplitude metric may be, for example, an integration of the FFT data (integrating under the 'curve').

In some embodiments, the amplitude metric may be a root mean square (RMS) value for the FFT data over the frequency range of interest.

A detection ratio x is calculated by dividing the amplitude metric by a noise value, at 1613. The noise value is indicative of a background value for the metric where a leak would not be considered to be occurring. The noise value may be calibrated for each location where a vibration sensor is placed or may be generalised for a water supply network or a sub-network. For example, the noise value for the amplitude metric that is an RMS value may be 40 micro-Volt seconds.

The detection ratio x is then compared to a first detection threshold, at 1614. If the detection ratio x is greater than or equal to the first detection threshold, then the leak counter value is incrementally increased, at 1618. The leak counter value may, for example, be increased by adding a value of 1 to the leak counter value. In some embodiments, the first detection threshold may be in the range of about 2 to 5, for example. In some embodiments, the first detection threshold may be about 3.5.

The sensed vibration signal strength may be correlated with the severity of a leak. As the detection ratio x is indicative of the signal strength, it may be advantageously used to determine if the vibrations are indicative of a burst or very severe leak. In some embodiments, if the detection ratio x is greater than or equal to the first detection threshold, then the detection ratio x is further compared to a second detection threshold, at 1615. The second detection threshold is greater than the first detection threshold. If the detection ratio x is greater than or equal to the second detection threshold, then the burst counter value is incrementally increased, at 1616. The burst counter value may, for example, be increased by adding a value of 1 to the burst counter value. In some embodiments, the second detection threshold may be in the range of about 5 to about 30, optionally about 15 to about 25, for example. In some embodiments, the first detection threshold may be about 20.

At 1619, the leak counter value is compared to a leak alarm level. If the leak counter value is greater than or equal to the leak alarm level, then a leak detection flag is set to a 'yes' state to indicate that a leak has been detected, at 1621. For example, setting the leak detection flag to 'yes' may correspond to setting a binary flag value to 1. The method 1600 is stopped after a leak detection flag is set. Requiring a leak counter value may advantageously reduce the occurrence of false alarms being raised as the detection ratio must be greater than or equal to the first detection threshold a number of instances before the alarm is raised. In some embodiments, the leak alarm level may be between 3 and 10 counts, optionally between 4 and 6 counts. In some embodiments, the leak alarm level may be 5 counts. The leak alarm level is less than the iteration limit.

In some embodiments, if the leak counter value is greater than or equal to the leak alarm level, then the burst counter value is compared to a burst alarm level (before stopping the method), at 1620. If the burst counter value is greater than or equal to the burst alarm level, a burst detection flag is set to a 'yes' state indicate that a burst has been detected, at 1622. For example, setting the burst detection flag to 'yes' may correspond to setting a binary flag value to 1. The method 1600 is stopped after a burst detection flag is set to 'yes'. In some situations, the leak detection flag and the burst detection flag may both be set to 'yes'. In some embodiments, the burst alarm level may be between 3 and 10 counts, optionally between 4 and 6 counts. In some embodiments, the burst alarm level may be 5 counts. The burst alarm level is less than the iteration limit.

In some embodiments, a leak alarm signal may be sent to a server 210 if the leak detection flag is set (before the method 1600 is stopped) to indicate that the leak detection flag is set. A burst alarm signal may be sent to a server 210 if the burst detection flag is set (but before the method 1600 is stopped) to indicate that the burst detection flag is set. The leak and burst alarm signals may be sent before, after or while the leak detection flag is set.

In other embodiments, the state of the leak and/or burst detection flags are stored for later retrieval in a data payload by the server 210. In some embodiments, only a burst alarm signal is sent to the server 210 while the leak detection flag is stored for later retrieval.

If the leak counter value is less than the alarm level, then an iteration period is waited, at 1624, before returning to step 1604. The iteration period may be between about 10 and about 20 minutes, for example. In some embodiments, the iteration period is about 15 minutes.

As method 1500, 1600 is limited to a set number of iterations, sensing and leak detection is also limited to a certain time period. This prevents sensing and leak detection from occurring over the entire predetermined time period. This is advantageous as it reduces energy consumption and timing can be selected to avoid noisy periods of time that correspond to peak water usage. By limiting the time over which method 1500, 1600 occurs, spurious alarms may be reduced and alarms for slow and intermittent leaks may be reduced or avoided.

In some embodiments, the vibrations are sensed and vibration data is recorded for a predetermined length of time in method 1500, 1600. The predetermined length of time may be in the range of 0.05 seconds to 0.2 seconds, optionally about 0.1 seconds, for example.

In some embodiments, the vibrations are sensed and vibration data is recorded between a predetermined time period. The predetermined time period may, for example, be between midnight and 6 am. The predetermined time period may correspond with times that there is low background (ambient) acoustic and/or vibrational noise. Sensing and recording during the predetermined time period may therefore advantageously result in better signal-to-noise ratios for recorded vibration measurements.

In some embodiments, methods 1500, 1600 are applied to leak detection at different locations using multiple separate vibration sensors, whether integrated into or connected with a water meter 100. Different vibration sensors may sense and record data obtained from different locations. Signals from each of the different vibration sensors may be sent to a server 210 and an alarm may be raised only if an alarm signal, leak alarm signal or burst alarm signal is received from multiple vibration sensors.

The sensor housing of various embodiments of vibration sensors described above (e.g., sensors 800, 900, 1100) may be formed of a plastic material or suitable metal material. It is generally preferred that the sensor housing be sealed, for example using a waterproof seal such as a sealing ring 943. For the biasing element applied in vibration sensors 800, 900, 1100 and 1200, a stainless steel or spring steel spring (or multiple such springs) is considered suitable. The biasing element may have a spring constant in the range from 1 to 15 N/mm, optionally from 2 to 15 N/mm or 3 to 12 N/mm, for example. A suitable force on the seismic weight may be in the range of about 45 to about 60 newtons, for example.

The seismic weight can comprise or consist of a brass alloy or manganese bronze or other suitable density material. The mass of the seismic weight may be in the range of 50 grams to about 200 grams, for example. Optionally, the mass of the seismic weight may be in the range of 100 grams to 175 grams, for example.

The electrodes positioned at each opposite end of the piezoelectric transducer in sensors, 800, 900, 1100 and 1200 can be formed of either a rigid or flexible material, with a thickness ranging from about 0.2 mm to about 1.6 mm, for example. The conductive tracks may be printed on one side (the side facing the piezoelectric transducer) of the flexible material, with the other side comprising substantially insulating material, for example.

While the piezoelectric transducer of various embodiments can comprise a PVDF material, a PZT material may perform better under certain circumstances. For example, PZT columnar shaped piezo-ceramic material used for the piezoelectric transducer may have an example column diameter of about 6.35 mm. The piezoelectric material may have a piezoelectric voltage constant ($g33$) in the range of about 0.02 to about 0.03 Vm/N, for example.

The sensor base may comprise a brass alloy or other metal that can be suitably flat and smooth, with a surface finish suited for optimal transfer of vibrations between the flow conduit 310 and the bottom or the piezoelectric transducer. In some embodiments, fasteners 929 used to couple the housing on to the sensor base may include, for example break-stem blind pop rivets, self-tapping screws for thermoplastics or machine screws and nuts. The fasteners 929 need to be able to clamp the sensor housing and base together against the spring force (e.g., 45 to 60 newtons) and the sealing force combined, and to be resistant to loosening due to vibrations.

Referring to FIGS. 17 to 22, further embodiments of a vibration sensor 1700 are shown and described. The vibration sensor 1700 is substantially the same in operation, structure and function as vibration sensor 900, with the primary difference being that a different electrical conductor configuration is used to sense the electrical output of the piezoelectric transducer 935. Like reference numerals are used among the drawings to indicate the same physical features or functions as between the vibration sensor 1700 and the vibration sensor 900.

Figure 22:
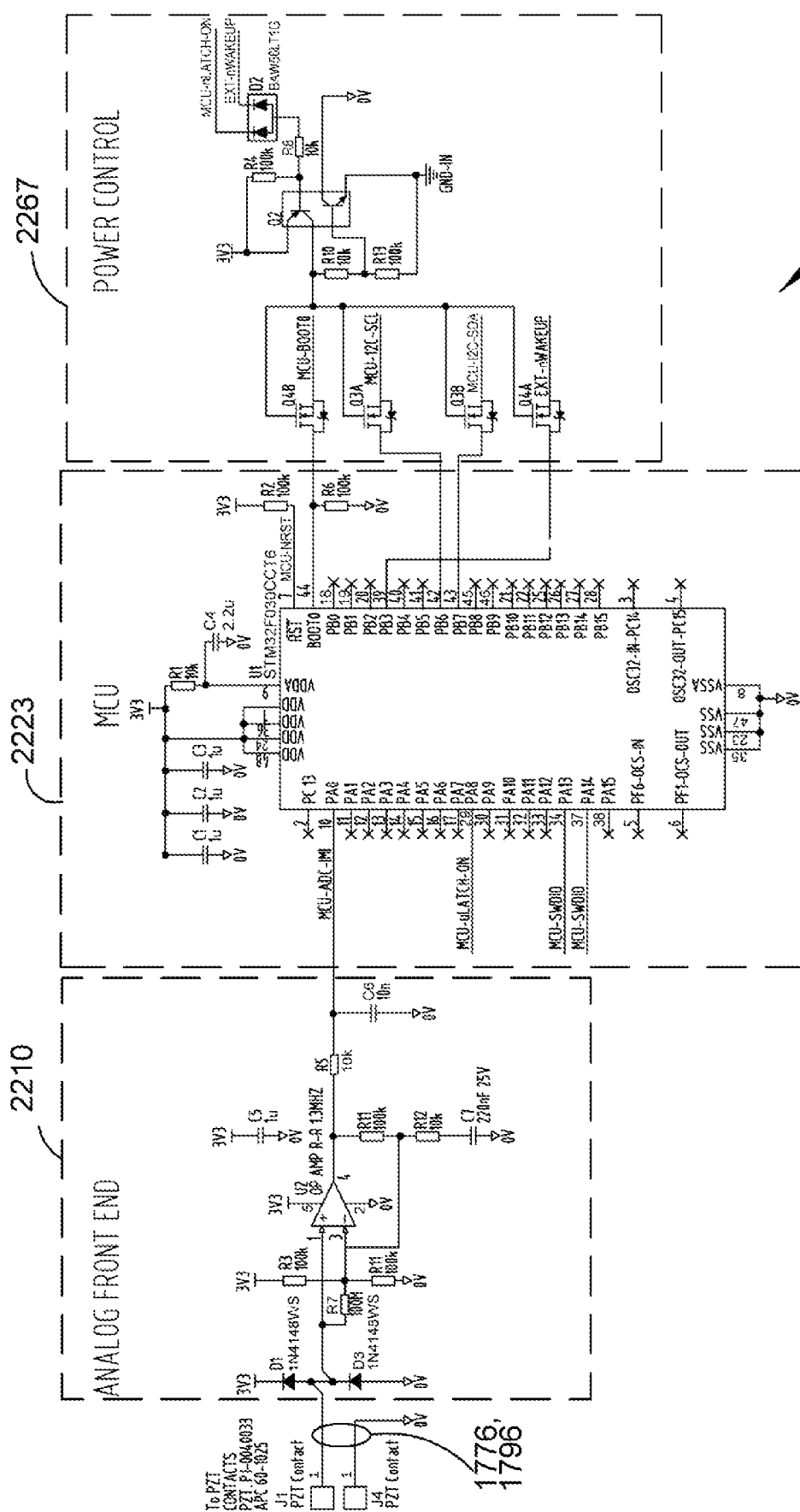
FIG. 22 is a schematic circuit diagram of an alternative printed circuit board assembly.

The vibration sensor 1700 uses a printed circuit board 1765 that has a rigid component 1770 and a flexible component 1780. The flexible component 1780 comprises a flexible coupling portion 1775 that acts as a bridge between the rigid printed circuit component 1770 (that houses the main electrical circuits as shown in FIG. 22) and a foldable portion of the flexible printed circuit 1780. The foldable portion is arranged to partially surround and contact the top and bottom surfaces of the piezoelectric transducer 935 in order to sense the electrical output thereof. In addition to the abovementioned differences from vibration sensor 900, vibration sensor 1700 may employ a gasket 1743 (instead of the sealing ring 943) for sealing the internal chamber of the vibration sensor 1700 against the ingress of water or gas. Additionally, the top housing part 1740 is slightly different from housing part 940, with an electrical connector passage defined at one end to extend close to the base plate 920. Different fasteners, such as bolts or screws 1729 may also be employed.

Figure 18:
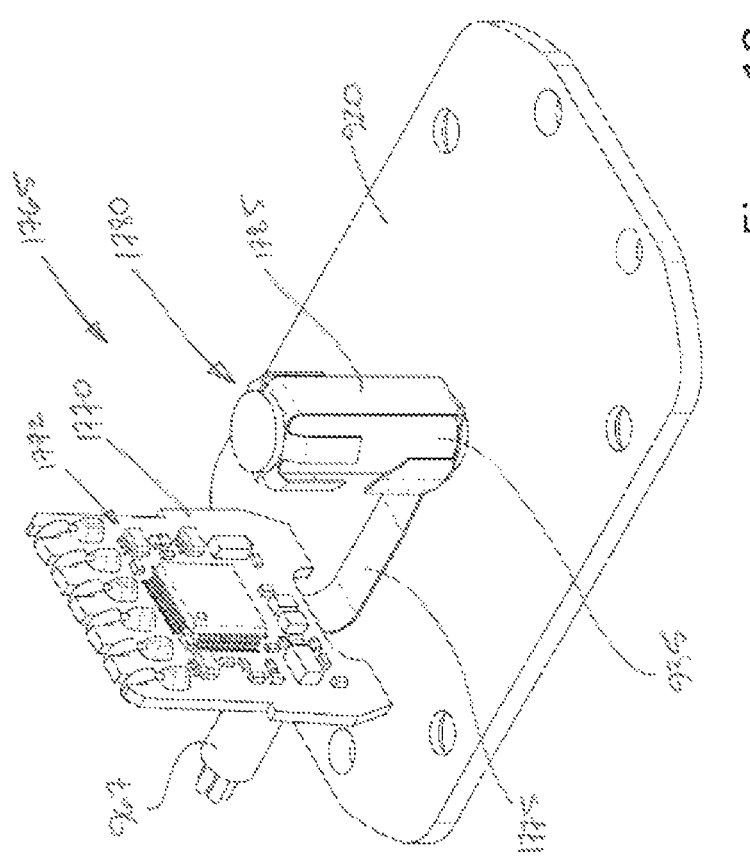
FIG. 18 is a perspective view of a printed circuit board and piezoelectric transducer positioned relative to a base plate of the vibration sensor of FIG. 17.
Figure 19:
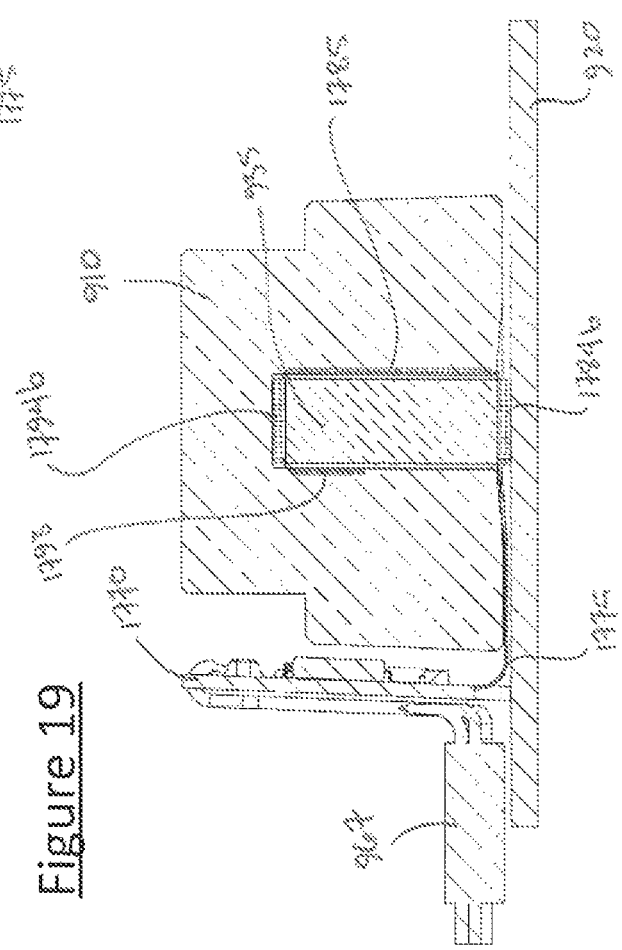
FIG. 19 is a cross-sectional side view of parts of the vibration sensor of FIG. 17, showing flexible printed circuitry covering part of the piezoelectric transducer within the seismic weight.
Figure 20:
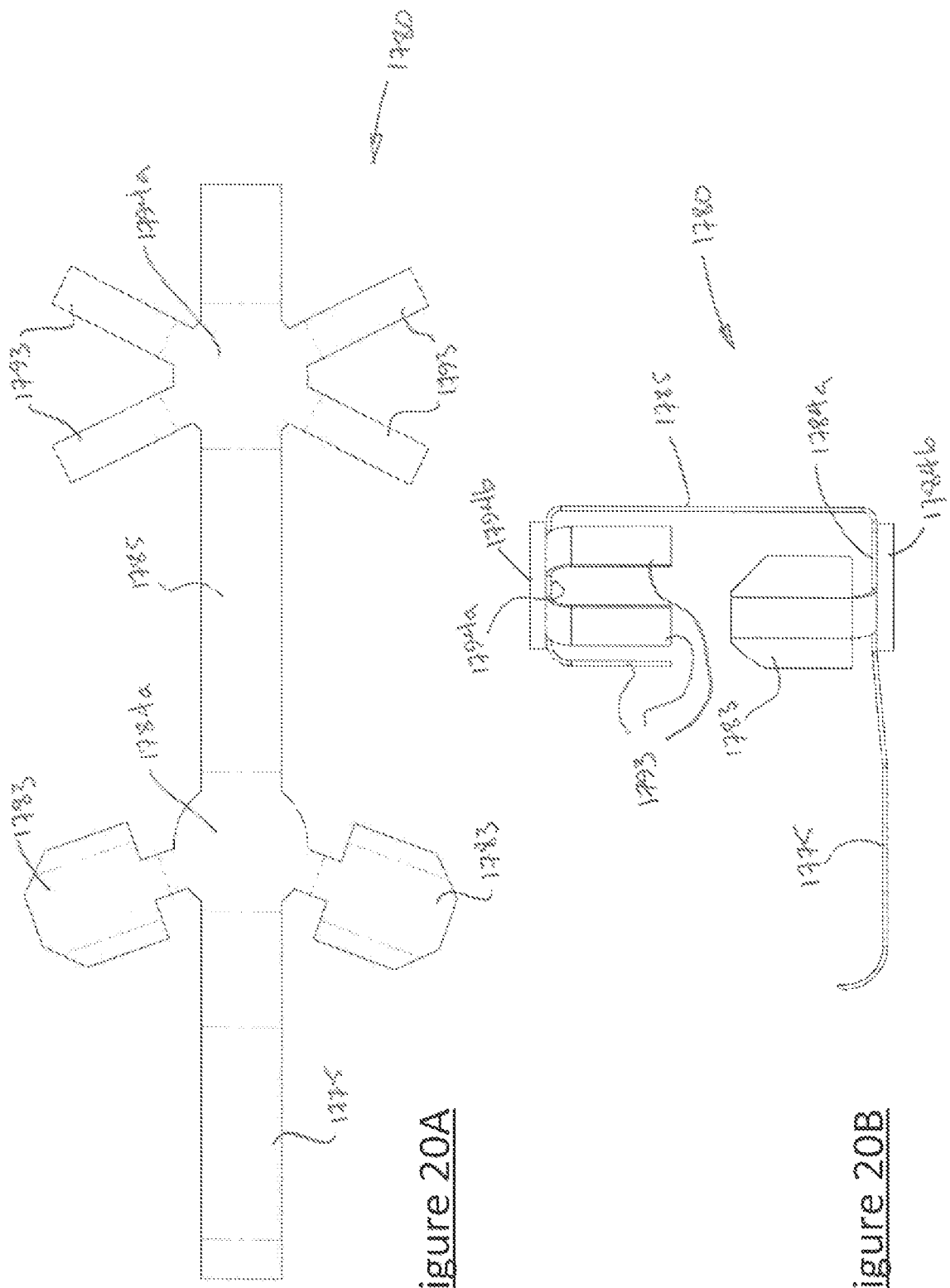
FIG. 20A is a plan view of a flexible printed circuit component for use with the vibration sensor embodiments of FIG. 17, shown in an unfolded configuration.
FIG. 20B is a side elevation view of the flexible printed circuit component of FIG. 20A, shown in a folded configuration, in which it would normally at least partially surround a cylindrical piezoelectric transducer.
Figure 21:
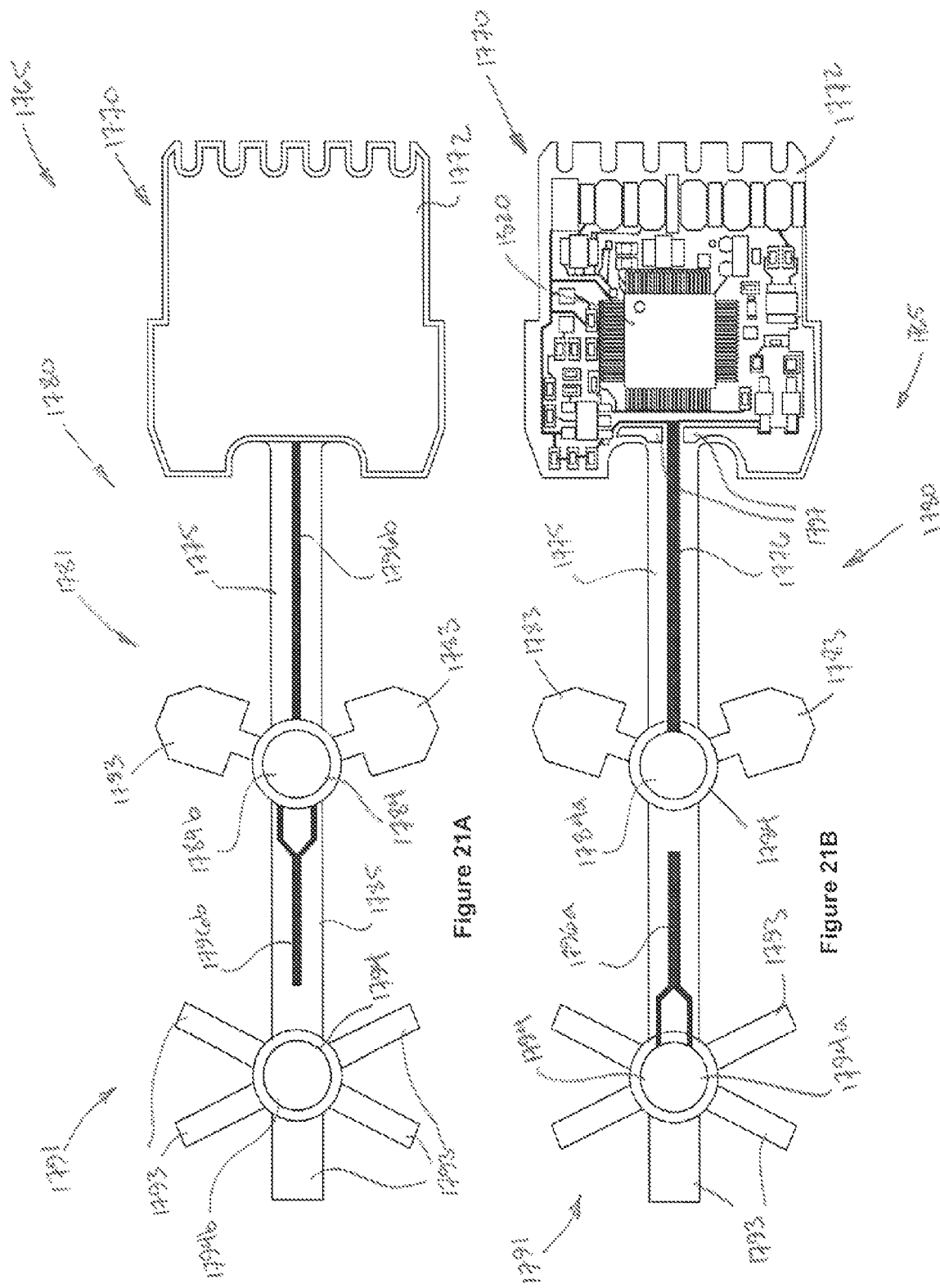
FIG. 21A is a back view of a printed circuit comprising the flexible printed circuit component of FIGS. 20A and 20B in combination with a printed circuit board for use in the vibration sensor embodiments shown in FIG. 17.
FIG. 21B is a front view of the printed circuit of FIG. 21A.

FIGS. 20A, 20B, 21A and 21B illustrate the printed circuit component 1765 in further detail. FIG. 20B shows the flexible printed circuit portion 1780 in a folded configuration and FIG. 18 shows how the piezoelectric transducer 935 is situated to be partially wrapped by the flexible printed circuit component 1780. The flexible printed circuit portion 1780 comprises a lower portion 1781 and an upper portion 1791 joined by a second coupling portion 1785 that extends between the lower portion 1781 and upper portion 1791.

The lower flexible printed circuit portion 1781 has a base 1784 with an upper side 1784A that has exposed conductive material (that may be gold plated, for example) thereon for receiving electrical potential variations (in the form of current and voltage) arising from electrical contact with the bottom of the piezoelectric transducers 935. The base 1784 also has a rigid bottom disc or plate portion 1784*b* (for example, formed of fibreglass "FR-4") that is an electrical insulator but which is rigid enough to transmit vibrations propagated through the sensor base 920 without substantial attenuation. The lower flexible printed circuit portion 1781 also has folding fingers or wings 1783 that are deformable from a flat configuration (see FIG. 20A) to a folded configuration (see FIG. 20B) in order to shield a lower part of the piezoelectric transducer 935 from contact with an inner surface of the seismic weight 910.

The upper flexible printed circuit part 1791 has a generally flat top portion 1794, which has a lower (inner) surface 1794A with exposed electrically conductive material (e.g., gold plated) and has a rigid insulating disc or plate portion 1794*b* on the upper (outer) face thereof. Similar to the lower portion 1781, the upper portion 1791 has a plurality of fingers or wings 1793 that can fold by bending or deforming to at least partially cover an upper part of the outside cylindrical wall of the piezoelectric transducer 935 to shield it from electrical contact with an inner wall of the seismic weight 910.

As seen best in FIGS. 21A and 21B, the flexible printed circuit 1780 has conductors printed thereon and extending from the top portion 1791 and the bottom portion 1781 to the rigid printed circuit board component 1770. In order to avoid the conductors for the top portion 1791 interfering with or crossing the conductors of the bottom portion 1781, a first conductor (or set of conductors) 1796*a* is coupled to the conductive area of the conductive lower surface 1794*a* of the top portion 1794. The first conductor 1796*a* extends along an inner wall of coupling portions 1785 without extending all the way to the lower portion 1781. Instead, to continue to conduct electrical signals, the first conductor 1796*a* couples to further first conductors 1796*b* on an opposite side of the second coupling portion 1785 by conductive through holes (not shown). The first conductors 1796B then pass between the plate or disc 1784*b* and the upper conductive surface 1784*a* of the bottom portion 1784, with the first conductor 1796*b* continuing on the underside of first coupling portion 1775 to finally couple (via through holes) to electrodes 1797 carried on the relatively rigid substrate 1772 of the rigid PCV portion 1770. The second conductors 1776 extend on a side of coupling portion 1175 opposite from conductors 1796 directly from the upper conductive surface 1784*a* of the bottom portion 1784 to electrodes or other circuit components on the relatively rigid substrate 1772.

As shown in the drawings, the upper set of fingers 1793 are arranged in a spaced array which, together with the second coupling portion 1785 that extends like a strip between the top portion 1791 and the bottom portion 1781, serves to generally avoid contact between the material of the piezoelectric transducer 935 and the inside wall of the seismic weight 910 (or other seismic weights described herein). A different arrangement of protective fingers or wings 1783 is provided extending from the lower portion 1781 which, together with the strip material of the coupling portion 1785, also serves to shield the piezoelectric transducers 935 from contact with the seismic weight 910.

Use of a single printed circuit board 1765 that has a flexible component 1780 and a rigid component 1770 allows for improved ease and efficiency of assembly of the piezoelectric transducer and electronic interface circuitry with the seismic weight 910 and the housing 1740 and sensor base 920. Both the bottom and top insulating discs or plates 1784B and 1794B are selected to be of sufficiently rigid material to substantially avoid dampening vibrations transmitted through the base plate 920 and thereby substantially avoid dampening relative movement between the piezoelectric transducer and the seismic weight 910.

FIG. 22 shows a further schematic circuit diagram to illustrate an alternative circuit layout for the printed circuit board assembly 970, shown in the embodiment of FIG. 22 as printed circuit board assembly 2270. Analogue front end 2210 shown in FIG. 22 is generally analogous to the analogue front end 1310 shown in FIGS. 13 and 14, but for a slight difference in arrangement (and values) of the output resistors and capacitors. The electrical conductors 1776 and 1796 shown in FIGS. 21A and 21B provide the input to the analogue front end 2210. A microcontroller unit 2220 is provided in the printed circuit board assembly 2270 and is similar in function to the microcontroller 1320 as described above. Power control circuitry 2267 is further comprised in the printed circuit board assembly 2270 and allows for receipt of a wakeup signal from an external controller, such as the water meter controller 120. Separate circuitry (not shown) may be provided for enabling communication between the microcontroller 2220 and an external controller.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A water meter, comprising:
   a flow tube defining a lumen to receive water through the lumen, wherein the flow tube is configured to be coupled to a water supply network;
   a housing coupled to the flow tube and containing a self-contained power source, at least one processor, a memory and a wireless transceiver;
   a flow sensor positioned to measure liquid flow through the lumen and coupled to the at least one processor to provide flow measurement signals to the at least one processor; and
   a vibration sensor arranged to sense vibration in a material of the flow tube and coupled to the at least one processor to provide vibration measurement signals to the at least one processor, the vibration sensor comprising a piezoelectric transducer and is arranged to abut the flow tube without extending into the lumen;
   wherein the at least one processor is configured to process the flow measurement signals and the vibration measurements signals and to determine an upstream liquid leakage status based on at least the vibration measurement signals;

wherein the at least one processor is configured to transmit the upstream liquid leakage status and flow measurement signals to a remote server, wherein the vibration sensor comprises a sensor base positioned proximal to the flow tube, at least one transducer or transducer substrate coupled to the sensor base, and a seismic weight coupled to the sensor base distal of the at least one transducer or transducer substrate, and wherein the at least one processor receives the vibration measurement signals based on electrical outputs from the at least one transducer or transducer substrate.

2. The meter of claim 1, wherein the at least one processor is configured to determine the upstream liquid leakage status by determining a frequency spectrum of the vibration measurement signals and determining whether an amplitude of the frequency spectrum in at least one frequency band is at or above a predetermined threshold amplitude.

3. The meter of claim 2, wherein the at least one processor is further configured so that, when the amplitude in the at least one frequency band is determined to be at or above the predetermined threshold amplitude, the at least one processor records a leakage detection indication of a possible upstream liquid leak in the water supply network.

4. The meter of claim 3, wherein the at least one processor sets the upstream liquid leakage status to indicate a detected liquid leak once a predetermined number of leakage detection indications have been recorded.

5. The meter of claim 1, further comprising a spring arranged to bias the seismic weight against the at least one transducer or transducer substrate.

6. The meter of claim 3, wherein the at least one processor is further configured to apply a further threshold to the frequency spectrum to determine the likely presence of an upstream fluid conduit burst in the water supply network.

7. The meter of claim 1, wherein the at least one processor is configured to selectively enable receipt of the vibration measurement signals at predetermined times in a repeating cycle.

8. The meter of claim 7, wherein the predetermined times are during at least one off-peak water usage period.

9. The meter of claim 7, wherein the predetermined times are separated by one to ten time intervals.

10. The meter of claim 1, further comprising a magnetometer positioned in the housing to sense a magnetic field of the flow tube and configured to provide a magnetic field sensor output to the at least one processor, wherein the at least one processor is configured to determine an electrical current in the flow tube based on the magnetic field sensor output.

11. The meter of claim 10, wherein the at least one processor is configured to set a leakage current alarm if the electrical current is determined to meet or exceed a human-safe current threshold.

12. The meter of claim 1, wherein the flow sensor is an ultrasonic flow sensor.

13. The meter of claim 1, wherein the at least one processor is configured to transmit the upstream liquid leakage status to the remote server from one to five times in a two day period.

14. The meter of claim 1, wherein the at least one processor comprises a first processor to receive and process the vibration measurement signals and a second processor to receive and process the flow measurement signals.

15. The meter of claim 14, wherein the first processor provides the upstream liquid leakage status to the second processor for transmission to the remote server.

16. The meter of claim 14, wherein the memory comprises:
a first memory accessible to the first processor but not the second processor; and
a second memory accessible to the second processor but not the first processor.

17. The meter of claim 1, further comprising at least one sensor selected from:
a pressure sensor to sense water pressure in the flow tube;
a stray current sensor to sense current in the flow tube;
an electrical conductivity sensor to sense electrical conductivity of fluid in the flow tube;
a fluid temperature sensor to sense temperature of fluid in the flow tube;
a pH sensor to sense pH of fluid in the flow tube;
a turbidity sensor to sense turbidity of fluid in the flow tube; or
a free chlorine sensor to sense free chlorine in fluid in the flow tube.

18. A water supply system, comprising:
a network of water supply conduits;
a plurality of water meters of claim 1 coupled to the network of water supply conduits at spaced water supply endpoints; and
the remote server, wherein the remote server is configured to generate a leakage notification when the upstream liquid leakage status of at least one of the plurality of water meters indicates detection of an upstream liquid leak.

19. A method of leakage detection in a fluid supply network, comprising,
receiving at the water meter according to claim 1, coupled at a supply end-point of the fluid supply network, vibrations propagated from fluid conduits that form part of the fluid supply network;
determining a leakage status based at least in part on the vibrations; and
notifying the remote server of the leakage status.

* * * * *